US011146481B2

(12) United States Patent
Ryu et al.

(10) Patent No.: US 11,146,481 B2
(45) Date of Patent: Oct. 12, 2021

(54) BASE STATION INITIATED CONTROL MECHANISM FOR SUPPORTING SUPPLEMENTAL LINK

(71) Applicant: QUALCOMM Incorporated, San Diego, CA (US)

(72) Inventors: Jung Ryu, Fort Lee, NJ (US); Sundar Subramanian, San Diego, CA (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/523,380

(22) Filed: Jul. 26, 2019

(65) Prior Publication Data

US 2019/0349289 A1 Nov. 14, 2019

Related U.S. Application Data

(63) Continuation of application No. 15/887,554, filed on Feb. 2, 2018, now Pat. No. 10,411,993, which is a
(Continued)

(51) Int. Cl.
*H04W 36/22* (2009.01)
*H04L 12/707* (2013.01)
(Continued)

(52) U.S. Cl.
CPC ............ *H04L 45/22* (2013.01); *H04W 76/15* (2018.02); *H04W 76/16* (2018.02); *H04W 28/06* (2013.01);
(Continued)

(58) Field of Classification Search
CPC .......... H04W 76/15; H04W 76/16; H04L 5/22
See application file for complete search history.

(56) References Cited

U.S. PATENT DOCUMENTS 5,751,708 A * 5/1998 Eng .................... H04L 12/2801
370/310.1
8,009,616 B2 8/2011 Saito
(Continued)

FOREIGN PATENT DOCUMENTS

CN 103477684 A 12/2013
EP 2557878 A1 2/2013
(Continued)

OTHER PUBLICATIONS

International Search Report and Written Opinion—PCT/US2015/044447—ISA/EPO—dated Oct. 30, 2015.
(Continued)

*Primary Examiner* — Wei Zhao
(74) *Attorney, Agent, or Firm* — Holland & Hart LLP

(57) ABSTRACT

Methods, systems, and apparatuses are described for a base station initiated control mechanism for supporting supplemental a link. In some aspects, control information associated with a directional, first radio access technology (RAT) for a user equipment (UE) may be identified at a first base station, the first base station configured to communicate with the UE using the directional, first RAT, and the control information associated with the directional, first RAT may be transmitted to a second base station to forward to the UE using a second RAT.

16 Claims, 16 Drawing Sheets

Related U.S. Application Data continuation of application No. 14/676,059, filed on Apr. 1, 2015, now Pat. No. 9,887,907.

(60) Provisional application No. 62/052,261, filed on Sep. 18, 2014.

(51) Int. Cl.
*H04W 76/16* (2018.01)
*H04W 76/15* (2018.01)
*H04W 48/10* (2009.01)
*H04W 28/06* (2009.01)
*H04W 88/06* (2009.01)
*H04W 92/20* (2009.01)
*H04W 28/08* (2009.01)

(52) U.S. Cl.
CPC ............ *H04W 28/08* (2013.01); *H04W 36/22* (2013.01); *H04W 48/10* (2013.01); *H04W 88/06* (2013.01); *H04W 92/20* (2013.01)

(56) References Cited

U.S. PATENT DOCUMENTS

| | | | |
|---|---|---|---|
| 8,625,539 B2 | 1/2014 | Gupta et al. |
| 8,804,616 B2 | 8/2014 | Grant et al. |
| 8,942,165 B2 | 1/2015 | Palanaki et al. |
| 8,965,431 B2 | 2/2015 | Karaoguz et al. |
| 9,125,133 B2 | 9/2015 | Ji et al. |
| 9,155,009 B2 | 10/2015 | Sane et al. |
| 9,203,559 B2 | 12/2015 | Wang et al. |
| 9,363,797 B2 | 6/2016 | Freda et al. |
| 9,380,584 B2 | 6/2016 | Xing et al. |
| 9,462,597 B2 | 10/2016 | Li et al. |
| 9,525,538 B2 | 12/2016 | Sirotkin |
| 9,572,108 B2 | 2/2017 | Schmidt et al. |
| 9,730,138 B2 | 8/2017 | Wang et al. |
| 9,806,789 B2 | 10/2017 | Khan et al. |
| 9,887,907 B2 | 2/2018 | Ryu et al. |
| 10,104,641 B2 | 10/2018 | Himayat et al. |
| 10,292,119 B2 | 5/2019 | Kummetz |
| 10,299,254 B2 | 5/2019 | Lindoff et al. |
| 2002/0032031 A1 | 3/2002 | Ogino et al. |
| 2007/0268846 A1 | 11/2007 | Proctor, Jr. |
| 2009/0313376 A1 | 12/2009 | Cedervall et al. |
| 2010/0080197 A1 | 4/2010 | Kanellakis et al. |
| 2011/0182174 A1 | 7/2011 | Pi et al. |
| 2012/0113839 A1 | 5/2012 | Etemad |
| 2013/0053078 A1 | 2/2013 | Barbieri et al. |
| 2013/0170435 A1 | 7/2013 | Dinan |
| 2013/0176979 A1 | 7/2013 | Ohwatari et al. |
| 2014/0023013 A1 | 1/2014 | Lee et al. |
| 2014/0073337 A1 | 3/2014 | Hong et al. |
| 2014/0206406 A1 | 7/2014 | Cordeiro et al. |
| 2014/0321282 A1 | 10/2014 | Pragada et al. |
| 2015/0029926 A1 | 1/2015 | Ryu et al. |
| 2015/0092676 A1 | 4/2015 | Periyalwar et al. |
| 2016/0219475 A1 | 7/2016 | Kim |
| 2016/0270075 A1 | 9/2016 | Huang et al. |
| 2017/0012887 A1* | 1/2017 | Ohta .................... H04W 28/18 |
| 2017/0163331 A1* | 6/2017 | Breiling ............ H04W 72/0406 |
| 2018/0159764 A1 | 6/2018 | Ryu et al. |

FOREIGN PATENT DOCUMENTS

| | | | |
|---|---|---|---|
| EP | 2709418 A2 | 3/2014 |
| JP | 2003235064 A | 8/2003 |
| JP | 2003318812 A | 11/2003 |
| JP | 2010233082 A | 10/2010 |
| JP | 2012504354 A | 2/2012 |
| JP | 2012060589 A | 3/2012 |
| JP | 2017514272 A | 6/2017 |
| JP | 2017532860 A | 11/2017 |
| KR | 20160068852 A | 6/2016 |
| WO | WO2010014969 A1 | 2/2010 |
| WO | WO2010034114 A1 | 4/2010 |
| WO | WO-2011019972 A1 | 2/2011 |
| WO | WO-2012074878 A2 | 6/2012 |
| WO | WO-2012134244 A2 | 10/2012 |
| WO | WO2012134567 A1 | 10/2012 |
| WO | WO2013048212 A2 | 4/2013 |
| WO | WO-2013086164 A1 | 6/2013 |
| WO | WO2013125766 A | 8/2013 |
| WO | WO-2014060544 A1 | 4/2014 |
| WO | WO-2014124024 A2 | 8/2014 |
| WO | WO2015002466 A | 1/2015 |
| WO | WO-2015074269 A1 | 5/2015 |
| WO | WO-2016043867 A1 | 3/2016 |

OTHER PUBLICATIONS

China Telecom: "Motivation for New SI: Network-controlled WLAN operation" RP-141364, 3GPP TSG RAN Meeting #65, Edinburgh, Scotland, Sep. 9-12, 2014, 3 Pages.

CMCC: "Scenarios and Requirements on WLAN/3GPP Radio Interworking", R2-130086, 3GPP TSG-RAN WG2 Meeting #81, Jan. 28-Feb. 1, 2013, St. Julian's, Malta, 4 Pages.

Himayat N., et al., "Multi-Radio Heterogeneous Networks: Architectures and Performance", 2014 International Conference on Computing, Networking and Communications, Invited Position Papers, Feb. 3-6, 2014, pp. 252-258.

Intel Corporation: "New SI Proposal: LTE-WLAN Radio Level Integration", RP-141276, 3GPP TSG RAN Meeting #65, Edinburgh, Scotland, Sep. 9-12, 2014, 6 Pages.

New Postcom: "Considerations on Requirements and Scenarios of WLAN/3GPP Radio Interworking", 3GPP Draft, R2-130270 Considerations on Requirements and Scenarios of WLAN and 3GPP Radio Interworking, 3rd Generation Partnership Project (3GPP), Mobile Competence Centre, 650, Route Des Lucioles, vol. Ran WG2, No. St. Julian, 20130128-20130201, Jan. 19, 2013 (Jan. 19, 2013), XP050668305, 4 p. Retrieved from the Internet: URL: http://www.3gpp.org/ftp/tsg_ran/WG2_RL2/TSGR2_81/Docs/ [retrieved on Jan. 19, 2013] 2.2 Deployment scenarios pp. 1,2.

Panasonic: "Signalling Aspect for Measurement Gap", R2-074855, 3GPP TSG RAN WG2 #60, Nov. 5-9, 2007, Jeju, Korea, 4 Pages.

Rangan S., et al., "Millimeter-Wave Cellular Wireless Networks Potentials and Challenges", Proceedings of the IEEE, vol. 102, No. 3, Mar. 2014, pp. 366-385.

* cited by examiner

BASE STATION INITIATED CONTROL MECHANISM FOR SUPPORTING SUPPLEMENTAL LINK

CROSS REFERENCES

The present Application for Patent is a Continuation of U.S. patent application Ser. No. 15/887,554 by Ryu, et al., entitled "Base Station Initiated Control Mechanism For Supporting Supplemental Link" filed Feb. 2, 2018, which is a Continuation of U.S. patent application Ser. No. 14/676,059 by Ryu, et al., entitled "Base Station Initiated Control Mechanism For Supporting Supplemental Link" filed Apr. 1, 2015 and claims priority to U.S. Provisional Patent Application No. 62/052,261 by Ryu et al., entitled "Base Station Initiated Control Mechanism For Supporting Supplemental Link," filed Sep. 18, 2014, assigned to the assignee hereof, and expressly incorporated by reference herein.

BACKGROUND

Field of the Disclosure

The present disclosure relates generally to wireless communication systems, and more particularly to a base station initiated control mechanism for supporting a supplemental link.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, space, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Various communication systems may use different frequency bands depending on the particular needs of the system. For example, a millimeter wave frequency band (which may be between 20 to 300 GHz) may be used where a large concentration of UEs are relatively close to one another and/or where a relatively large amount of data is to be transferred from a base station to one or more UEs, or vice versa. Millimeter wavelength signals, however, frequently experience high path loss, and as a result, directional beam forming techniques may be used for uplink (UL) and/or downlink (DL) transmissions between a base station and a UE using millimeter wavelength frequencies. The reliance on directional beams, however, may make millimeter wave communications less reliable and more resource-intensive to set up than other radio access technologies (RATs). For example, Long Term Evolution (LTE) technology may be more reliable and less resource-intensive to set up, but may have a smaller overall throughput than a millimeter wave-based RAT.

SUMMARY

The described features generally relate to one or more improved systems, methods, and/or apparatuses for a base station initiated control mechanism for supporting a supplemental link. A first base station configured to communicate with a user equipment (UE) using a directional, first radio access technology (RAT), such as a millimeter wave-based RAT, may identify control information that needs to be transmitted to the UE relating to the directional, first RAT. The first base station, however, may find it undesirable or may be unable to send the control information to the UE using the directional, first RAT. For example, if no direct connection between the first base station and the UE is established using the first RAT, the first base station may find it undesirable to perform a beam search and negotiate a connection with the UE in view of the relatively small amount of control data to be sent to the UE. As other examples, the first base station may be overloaded with traffic being served to other UEs, an obstacle may be preventing sufficient beamforming between the first base station and the UE, and so forth. The first base station may, however, be connected to a second base station configured to communicate with the UE using a second RAT, such as a long term evolution (LTE) based RAT. Accordingly, the first base station may transmit the control information to the second base station for the second base station to forward the control information to the UE using the second RAT. The second RAT may be more reliable, require less overhead to set up a connection, and so forth. In this manner, the capability of the second base station and its connection to the UE can be used to support and supplement the operation of the first base station and the directional, first RAT.

A method for wireless communication is thus described, with the method including identifying, at a first base station, control information associated with a directional, first radio access technology (RAT) for a user equipment (UE), the first base station configured to communicate with the UE using the directional, first RAT, and transmitting the control information associated with the directional, first RAT to a second base station to forward to the UE using a second RAT.

Also, an apparatus for wireless communication is described, with the apparatus including means for identifying, at a first base station, control information associated with a directional, first radio access technology (RAT) for a user equipment (UE), the first base station configured to communicate with the UE using the directional, first RAT, and means for transmitting the control information associated with the directional, first RAT to a second base station to forward to the UE using a second RAT.

Also, another apparatus for wireless communication is described, with the apparatus including a processor, a memory in electronic communication with the processor, and instructions stored in the memory, with the instructions being executable by the processor to identify, at a first base station, control information associated with a directional, first radio access technology (RAT) for a user equipment (UE), the first base station configured to communicate with the UE using the directional, first RAT, and also to transmit the control information associated with the directional, first RAT to a second base station to forward to the UE using a second RAT.

Also, a non-transitory computer-readable medium for wireless communication in a wireless device is described, the non-transitory computer-readable medium storing computer-executable code for identifying, at a first base station, control information associated with a directional, first radio access technology (RAT) for a user equipment (UE), the first base station configured to communicate with the UE using the directional, first RAT, and for transmitting the control information associated with the directional, first RAT to a second base station to forward to the UE using a second RAT.

In some examples of the method, apparatuses, and/or computer-readable medium, forwarding information may be included in the control information indicating to the second base station to forward the control information to the UE. The forwarding information may specify whether the control information should be forwarded by the second base station using a control channel or a data channel of the second RAT. Also, identifying information may be included in the control information indicating to the UE that the control information originated from the first base station.

In some examples, the control information may be transmitted from the first base station to the second base station over a backhaul link connecting the first base station and the second base station. A connection between the first base station to the second base station over the backhaul link and between the second base station and the UE may form a supplemental link between the first base station and the UE, and/or the backhaul link may be an X2 interface.

In some examples, the control information may be transmitted from the first base station to the second base station in response to an insufficient direct connection between the first base station and the UE over the directional, first RAT. The control information may not be able to be transmitted from the first base station to the UE using the directional, first RAT due to the insufficient direct connection in some instances. In various examples, the insufficient direct connection between the first base station and the UE may be due to a lack of data to be transmitted between the first base station and the UE over the directional, first RAT, due to a failure of a previous transmission beam from the first base station, due to movement of the UE relative to the first base station, due to an inadequate transmission beam between the first base station and the UE, due to overloading of the first base station, due to overloading of the directional, first RAT, some combination of these, and so forth.

In some examples, the control information may be transmitted from the first base station to the second base station to conserve resources associated with the directional, first RAT. In some examples, the control information may be transmitted from the first base station to the second base station to conserve power at the first base station. Also, response information may be received from the UE responsive to the transmitted control information, the response information being first transmitted from the UE to the second base station using the second RAT and then forwarded from the second base station to the first base station over a backhaul link. The control information may include one or more of beam search coordination instructions, beam search results, scheduling grants, a channel quality information (CQI) command, a keep-alive message, beam change information, an overload indication related to the first base station, or a combination thereof, and so forth.

In some examples, the directional, first RAT may be a millimeter wave RAT, and the first base station may use beam forming to communicate with the UE via the millimeter wave RAT. The second RAT may be more reliable than the directional, first RAT and may have a smaller bandwidth capacity than the directional, first RAT. The second RAT may be, for example, a Long Term Evolution (LTE) RAT.

Also, another method for wireless communication is thus described, with the method including receiving, at a user equipment (UE), control information associated with a directional, first radio access technology (RAT) for a first base station, the first base station configured to communicate with the UE using the directional, first RAT, the control information being received at the UE from a second base station, the second base station configured to communicate with the UE using a second RAT, and transmitting response information to the second base station using the second RAT, the response information being forwarded to the first base station based at least in part on the received control information.

Also, another apparatus for wireless communication is described, with the apparatus including means for receiving, at a user equipment (UE), control information associated with a directional, first radio access technology (RAT) for a first base station, the first base station configured to communicate with the UE using the directional, first RAT, the control information being received at the UE from a second base station, the second base station configured to communicate with the UE using a second RAT, and means for transmitting response information to the second base station using the second RAT, the response information being forwarded to the first base station based at least in part on the received control information.

Also, another apparatus for wireless communication is described, with the apparatus including a processor, a memory in electronic communication with the processor, and instructions stored in the memory, with the instructions being executable by the processor to receive, at a user equipment (UE), control information associated with a directional, first radio access technology (RAT) for a first base station, the first base station configured to communicate with the UE using the directional, first RAT, the control information being received at the UE from a second base station, the second base station configured to communicate with the UE using a second RAT, and to transmit response information to the second base station using the second RAT, the response information being forwarded to the first base station based at least in part on the received control information.

Also, another non-transitory computer-readable medium for wireless communication in a wireless device is described, the non-transitory computer-readable medium storing computer-executable code for receiving, at a user equipment (UE), control information associated with a directional, first radio access technology (RAT) for a first base station, the first base station configured to communicate with the UE using the directional, first RAT, the control information being received at the UE from a second base station, the second base station configured to communicate with the UE using a second RAT, and for transmitting response information to the second base station using the second RAT, the response information being forwarded to the first base station based at least in part on the received control information.

In some examples of the method, apparatuses, and/or computer-readable medium, a task may be performed responsive to the received control information, the response information including results of the performed task. Also, the received control information may, in some examples, include forwarding information indicating to the UE to transmit the response information to the second base station for forwarding to the first base station over a backhaul link between the second base station and the first base station. Also, the response information may include one or more of a channel quality indication (CQI) report, a keep-alive message reply, beam change information, beam searching information, or a combination thereof, and so forth. In some instances, the control information may first be received at the second base station from the first base station and then forwarded to the UE from the second base station using the second RAT.

Also, another method for wireless communication is thus described, with the method including receiving, from a first base station, control information associated with a directional, first radio access technology (RAT) for a user equipment (UE), the first base station configured to communicate with the UE using the directional, first RAT, and determining whether to forward the control information to the UE using a second RAT.

Also, another apparatus for wireless communication is described, with the apparatus including means for receiving, from a first base station, control information associated with a directional, first radio access technology (RAT) for a user equipment (UE), the first base station configured to communicate with the UE using the directional, first RAT, and means for determining whether to forward the control information to the UE using a second RAT.

Also, another apparatus for wireless communication is described, with the apparatus including a processor, a memory in electronic communication with the processor, and instructions stored in the memory, with the instructions being executable by the processor to receive, from a first base station, control information associated with a directional, first radio access technology (RAT) for a user equipment (UE), the first base station configured to communicate with the UE using the directional, first RAT, and to determine whether to forward the control information to the UE using a second RAT.

Also, another non-transitory computer-readable medium for wireless communication in a wireless device is described, the non-transitory computer-readable medium storing computer-executable code for receiving, from a first base station, control information associated with a directional, first radio access technology (RAT) for a user equipment (UE), the first base station configured to communicate with the UE using the directional, first RAT, and for determining whether to forward the control information to the UE using a second RAT.

In some examples of the method, apparatuses, and/or computer-readable medium, the control information may be selectively forwarded to the UE based at least in part on the determining, or a notification may be selectively transmitted to the first base station when the control information is not forwarded to the UE. The control information may be transmitted to the UE over a control channel or a data channel associated with the second RAT. In some examples, response information may be received from the UE responsive to the control information, and the response information may be forwarded to the first base station over a backhaul link.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
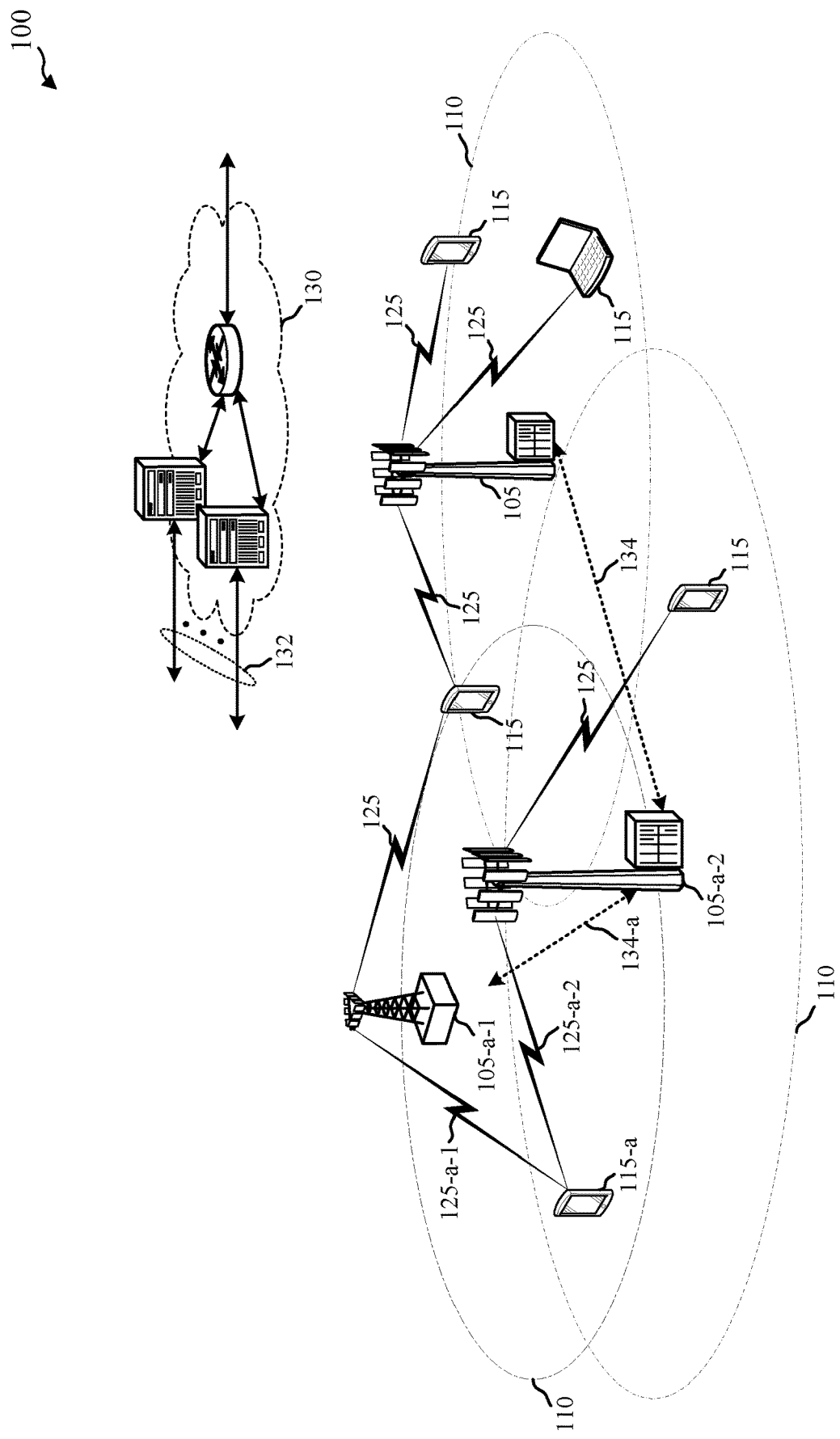
FIG. 1 shows a diagram of a wireless communication system, in accordance with various aspects of the present disclosure.

Features generally relating to a base station initiated control mechanism for supporting a supplemental link are disclosed. As described in more detail below, a first base station may be configured to communicate with a user equipment (UE) using a directional, first radio access technology (RAT), such as a millimeter wave-based RAT. Other base stations may also be configured to communicate with the UE using the same or a different RAT. For example, a second base station may be configured to communicate with the UE using a second RAT, such as a long term evolution (LTE) based RAT. In some circumstances, the first base station may identify control information that needs to be transmitted to the UE, but may be unable to transmit the control information to the UE using the first RAT or may find it undesirable to transmit the control information to the UE using the first RAT. In these circumstances, the first base station may transmit the control information to the second base station over, for example, a backhaul link connecting the first and second base stations.

Upon receiving the control information from the first base station, the second base station may forward the control information to the UE using the second RAT. In some instances, however, the second base station may not automatically transmit the control information, but instead may determine whether or not to transmit the control information to the UE based on one or more factors (e.g., the traffic load of the second base station, the number of control information forwarding requests from the first base station, etc.) If the second base station does forward the control information to the UE, the UE may, upon receiving the control information, perform one or more tasks based on the control information. Based on the received control information and/or the performed task(s), the UE may need to transmit response information back to the first base station. As above, however, the UE may be unable to or may find it undesirable to transmit the response information directly back to the first base station using the directional, first RAT. Accordingly, the UE may transmit the response information to the second base station for forwarding on to the first base station over the backhaul link connecting the first and second base stations. In this manner, the second base station and its associated second RAT may provide a supplemental link for supporting the transmission of control and response information indirectly between the first base station and the UE.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, X2, etc.), which may be wired or wireless communication links with relatively high throughput and/or low latency.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies. For example, as shown in FIG. 1, one base station 105-*a*-1 may be configured to communicate with one or more UEs 115, 115-*a* using a directional RAT (such as a millimeter wave-based RAT), and another base station 105-*a*-2 may be configured to communicate with one or more UEs 115, 115-*a* using a different type of RAT (such as an LTE-based RAT).

In some examples, at least some components of the wireless communications system 100 are LTE/LTE-A based components. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. As illustrated in FIG. 1, a first base station 105-a-1 may have, or may be configured to have, a first type of communication link 125-a-1 with a UE 115-a, which may be a millimeter wave-based communication link. Similarly, a second base station 105-a-2 may have, or may be configured to have, a second type of communication link 125-a-2 with the UE 115-a, which may be an LTE-based communication link.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Still referring to the wireless communications system 100 in FIG. 1, in some embodiments, the first base station 105-a-1 that is configured to communicate with the UE 115-a using a directional, first RAT such as a millimeter wave-based RAT, may identify control information for the UE 115-a—for example control information related to the directional, first RAT and the UE 115-a. Due to an insufficient connection and/or a desire to conserve resources (e.g., frequency and time resources) and/or power at the first base station 105-a-1, the first base station 105-a-1 may transmit the control information to the second base station 105-a-2 for forwarding on to the UE 115-a by the second base station 105-a-2. The second base station 105-a-2 may also be configured to communicate with the UE 115-a, but may do so using a second RAT, such as an LTE-based RAT. The second RAT may be more reliable than the directional, first RAT, but may have a smaller bandwidth capacity than the directional, first RAT. For example, as described above, a millimeter wave-based RAT may have a relatively large bandwidth capacity as compared to an LTE-based RAT, but the LTE-based RAT may be reliable and more available over a larger geographical area.

The millimeter wave-based RAT may use beamforming to communicate with the UE 115-a (e.g., to reduce path loss, to reduce reflections, etc.), but the use of beams may cause the link to be somewhat unreliable if, for example, the UE 115-a moves. Also, before a transmission link can be established, the base station 105-a-1 and the UE 115-a may need to search for an appropriate beam direction and/or width. In comparison, establishing and maintaining an LTE-based link may require less overhead.

The second base station 105-a-2 in FIG. 1 may receive the control information related to the UE 115-a from the first base station 105-a over backhaul link 134-a (which may be, for example, an X2 interface), and may determine whether to forward the control information to the UE 115-a. If the second base station 105-a-2 does transmit the control information to the UE 115-a using the second RAT, the UE 115-a may, in turn, transmit response information to the second base station 105-a-2 based at least in part on the received control information, for forwarding on to the first base station 105-*a*-1. In this manner, the control and response information is not transmitted over a direct connection between the first base station 105-*a*-1 and the UE 115-*a*, but is instead transmitted over a supplemental link formed by the connection between the first and second base stations 105-*a*-1, 105-*a*-2 (e.g., a backhaul link) together with the wireless connection between the second base station 105-*a*-2 and the UE 115-*a* over the second RAT.

Figure 2:
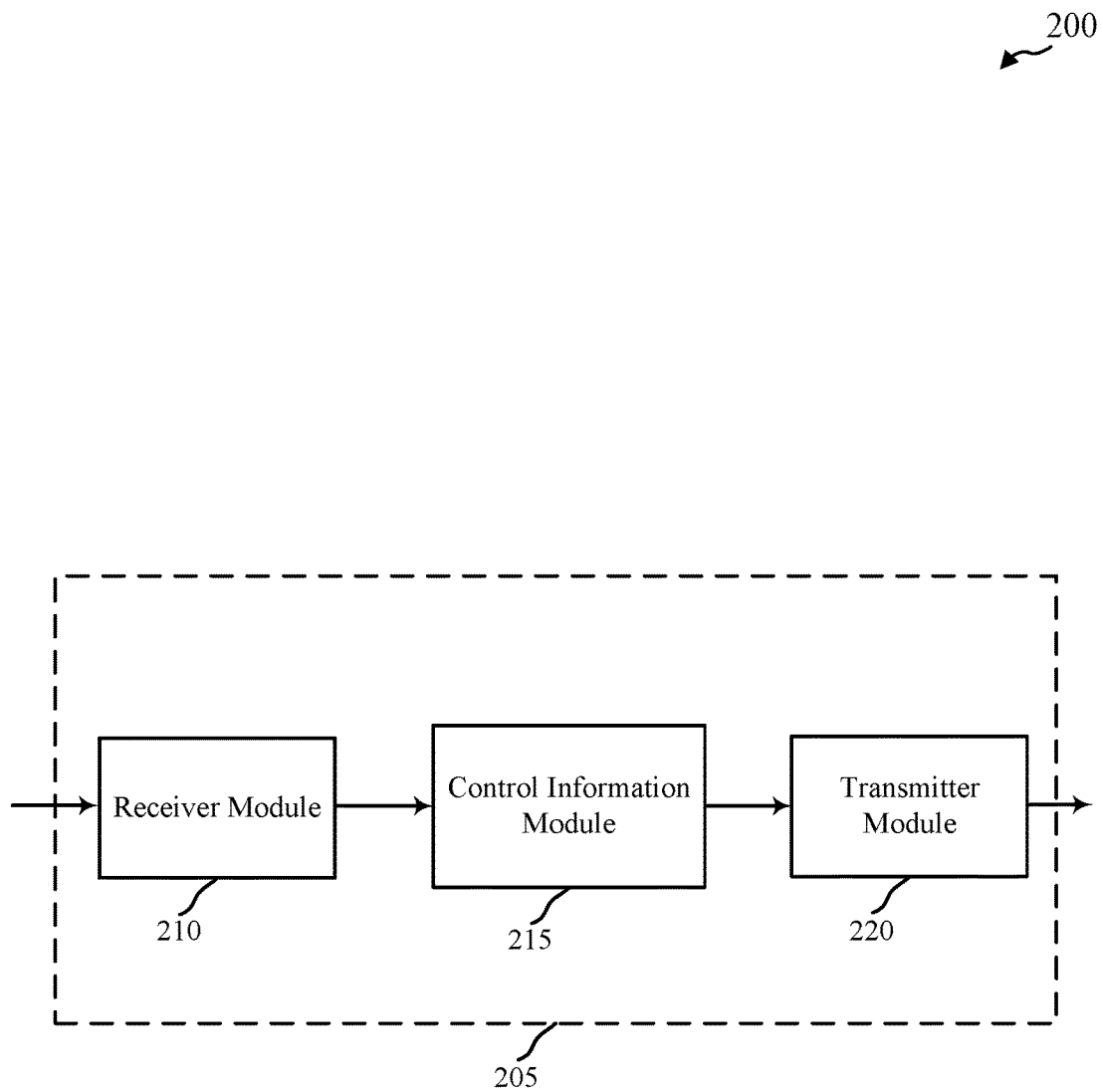
FIG. 2 shows a block diagram of a device configured for use in wireless communication, in accordance with various aspects of the present disclosure.

FIG. 2 shows a block diagram 200 of a device 205 for use in wireless communication, in accordance with various aspects of the present disclosure. The device 205 may be an example of one or more aspects of a UE 115, 115-*a* described above with reference to FIG. 1 and/or an example of one or more aspects of a base station 105, 105-*a*-1, 105-*a*-2 described above with reference to FIG. 1 and/or an example of one or more aspects of the core network 130 described above with reference to FIG. 1. The device 205 may include a receiver module 210, a control information module 215, and/or a transmitter module 220. The device 205 may also include a processor (not shown). Each of these modules may be in communication with each other.

The components of the device 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 210 may receive information such as packets, user data, and/or control information associated with various information channels (e.g., control channels, data channels, etc.). If the device 205 is a UE 115, the receiver module 210 may be configured to wirelessly receive user data and control signaling from one or more base stations 105, 105-*a*-1, 105-*a*-2, which may use one or more different RATs to wirelessly communicate with the UE 115. If the device 205 is a base station 105, the receiver module may be configured to receive user data from the core network 130 in FIG. 1 to be forwarded to respective UEs 115. Also, if the device is, more specifically, the first base station 105-*a*-1, the receiver module 210 may be configured to receive control information (e.g., as transmitted from the core network 130 or as generated from another component of the first base station 105-*a*-1) related to a UE 115-*a*, such as beam search coordination instructions, scheduling grants, and so forth. This receiver module 210 for the first base station 105-*a*-1 may also be configured to receive response information from the UE 115-*a* via the second base station 105-*a*-2. If, on the other hand, the device 205 is the second base station 105-*a*-2, the receiver module 210 may be configured to receive control information from the first base station 105-*a*-1 to be forwarded to the UE 115-*a*, and may also receive response information from the UE 115-*a* to be forwarded to the first base station 105-*a*-1. Information received by the receiver module 210 may be passed on to the control information module 215, and to other components of the device 205.

The control information module 215 may be configured to identify, generate, act on, or otherwise process control information regarding a base station 105, 105-*a*-1, 105-*a*-2, a UE 115, 115-*a*, and/or one or more RATs. For example, the control information may relate to wireless communication between the UE 115-*a* and the first base station 105-*a*-1 in FIG. 1, and may include, for example, beam search coordination instructions, beam search results, scheduling grants, a channel quality indication (CQI) command, a keep-alive message, beam change information, an overload indication, or a combination thereof. In some embodiments, the control information may be time or delay sensitive. The control information module 215 may also be configured to identify, generate, act on, or otherwise process response information in addition to control information, as described in more detail below.

In those examples where the device 205 of FIG. 2 is a first base station 105-*a*-1 from FIG. 1 that is configured to communicate with a UE 115-*a* using a directional, first RAT, the control information module 215 may be configured to identify, at the first base station 105-*a*-1, control information associated with the directional, first RAT and the UE 115-*a*, and to transmit (or initiate transmission via transmitter module 220) the control information to the second base station 105-*a*-2 in FIG. 1 to forward to the UE 115-*a* using a second RAT. In those examples where the device 205 of FIG. 2 is a second base station 105-*a*-2 from FIG. 1 that is configured to communicate with the UE 115-*a* using the second RAT, the control information module 215 may be configured to process control information associated with the directional, first RAT for the UE as received from the first base station 105-*a*-1 from FIG. 1 in order to determine whether to forward the control information to the UE 115-*a* using the second RAT. In those examples where the device 205 of FIG. 2 is the UE 115-*a* from FIG. 1, the control information module 215 may be configured to process control information received from the first base station 105-*a*-1 via the second base station 105-*a*-2 in order to perform a task responsive to the received control information and/or to transmit response information to the second base station 105-*a*-2 for forwarding on to the first base station 105-*a*-1.

The transmitter module 220 may transmit one or more signals received from other components of the device 205, including those generated within the device 205. For example, if the device 205 is a UE 115, the transmitter module 220 may be configured to transmit response information to the second base station 105-*a*-2 to be forwarded to the first base station 105-*a*-1 based at least in part on received control information. If the device 205 is the first base station 105-*a*-1, the transmitter module 220 may be configured to transmit control information for the UE 115-*a* to the second base station 105-*a*-2 for forwarding to the UE 115-*a*, whereas if the device 205 is the second base station 105-*a*-2, the transmitter module 220 may be configured to transmit control information received from the first base station 105-*a*-1 to the UE 115-*a* and also to transmit response information received from the UE 115-*a* to the first base station 105-*a*-1. In some examples, the transmitter module 220 may be collocated with the receiver module 210 in a transceiver module.

Figure 3:
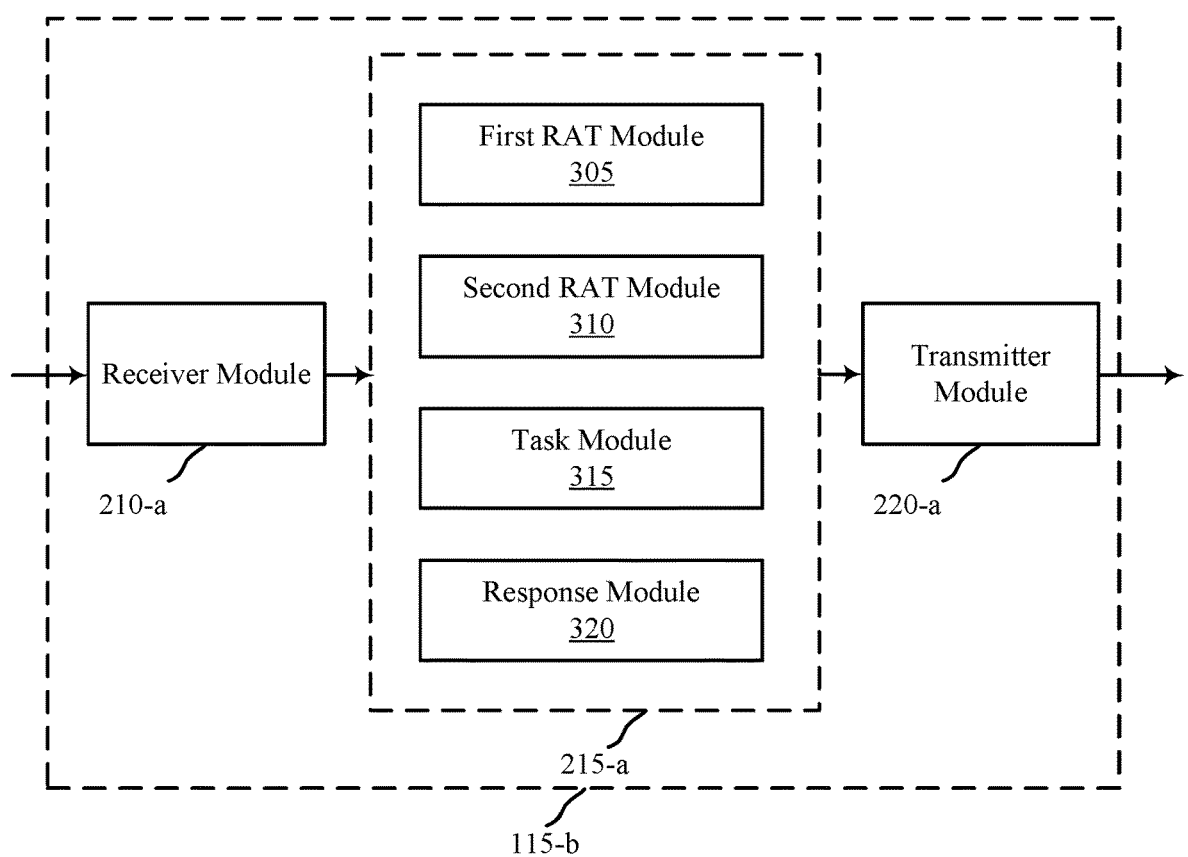
FIG. 3 shows a block diagram of a device configured for use in wireless communication, in accordance with various aspects of the present disclosure.

FIG. 3 shows a block diagram 300 of a UE 115-*b* for use in wireless communication, in accordance with various examples. The UE 115-*b* may be an example of one or more aspects of the device 205 described above with reference to FIG. 2 and/or an example of one or more aspects of the UEs 115, 115-*a* described above with reference to FIG. 1. The UE 115-*b* may include a receiver module 210-*a*, a control information module 215-*a*, and/or a transmitter module 220-a, which may be examples of the corresponding modules of device 205 in FIG. 2. The UE 115-b may also include a processor (not shown). Each of these components may be in communication with each other. The control information module 215-a may include a first RAT module 305, a second RAT module 310, a task module 315, and a response module 320. The receiver module 210-a and the transmitter module 220-a may perform the functions of the receiver module 210 and the transmitter module 220, of FIG. 2, respectively. The UE 115-b in FIG. 3 may be configured to form wireless communication links with one or multiple different base stations using one or multiple different types of RATs.

As described above, the control information module 215-a of the UE 115-b may be configured to receive control information associated with a directional, first RAT and a first base station (e.g., base station 105-a-1 in FIG. 1), where the first base station is configured to communicate with the UE 115-b using the directional, first RAT. The directional, first RAT may be a millimeter wave-based RAT in some embodiments. The control information may, as described above, be received at the UE 115-b from a second base station (e.g., base station 105-a-2 in FIG. 1) that is configured to communicate with the UE 115-b using a second RAT, such as an LTE-based RAT. In this example, the control information may first be received at the second base station from the first base station and then forwarded to the UE 115-b from the second base station using the second RAT. The control information module 215-a of the UE 115-b in FIG. 3 may also be configured to transmit response information to the second base station using the second RAT and based at least in part on the received control information, so that the second base station can, in turn, forward the response information to the first base station.

The first RAT module 305 of the control information module 215-a in FIG. 3 may be configured to communicate with a first base station using a directional, first RAT, such as a millimeter wave-based RAT. The second RAT module 310 of the control information module 215-a in FIG. 3 may be configured to communicate with a second base station using a second RAT, such as an LTE-based RAT. The second RAT module 310 thus may be configured to receive control information from the second base station using the second RAT for use in the control information module 215-a. In some embodiments, the received control information may include forwarding information indicating to the UE 115-b to transmit the response information to the second base station using the second RAT (instead of to the first base station using the directional, first RAT) for forwarding to the first base station over a backhaul link between the second base station and the first base station.

The task module 315 of the control information module 215-a in FIG. 3 may be configured to perform one or more tasks responsive to the received control information, and may also be optionally configured to provide results of the performed one or more tasks to the response module 320.

The response module 320 of the control information module 215-a in FIG. 3 may be configured to generate response information to be transmitted to the second base station for forwarding to the first base station based at least in part on the received control information, the one or more tasks performed by the task module 315, the results of the one or more tasks provided by the task module 315, or some combination thereof. In various embodiments, the response information may include one or more of a channel quality indication (CQI) report, a keep-alive message reply, beam change information, beam searching information, or a combination thereof. The response module 320 may also be configured to provide an indication in the response information indicating that the response information is to be forwarded to the first base station, so that the second base station understands and can forward the response information on to the first base station.

Figure 4:
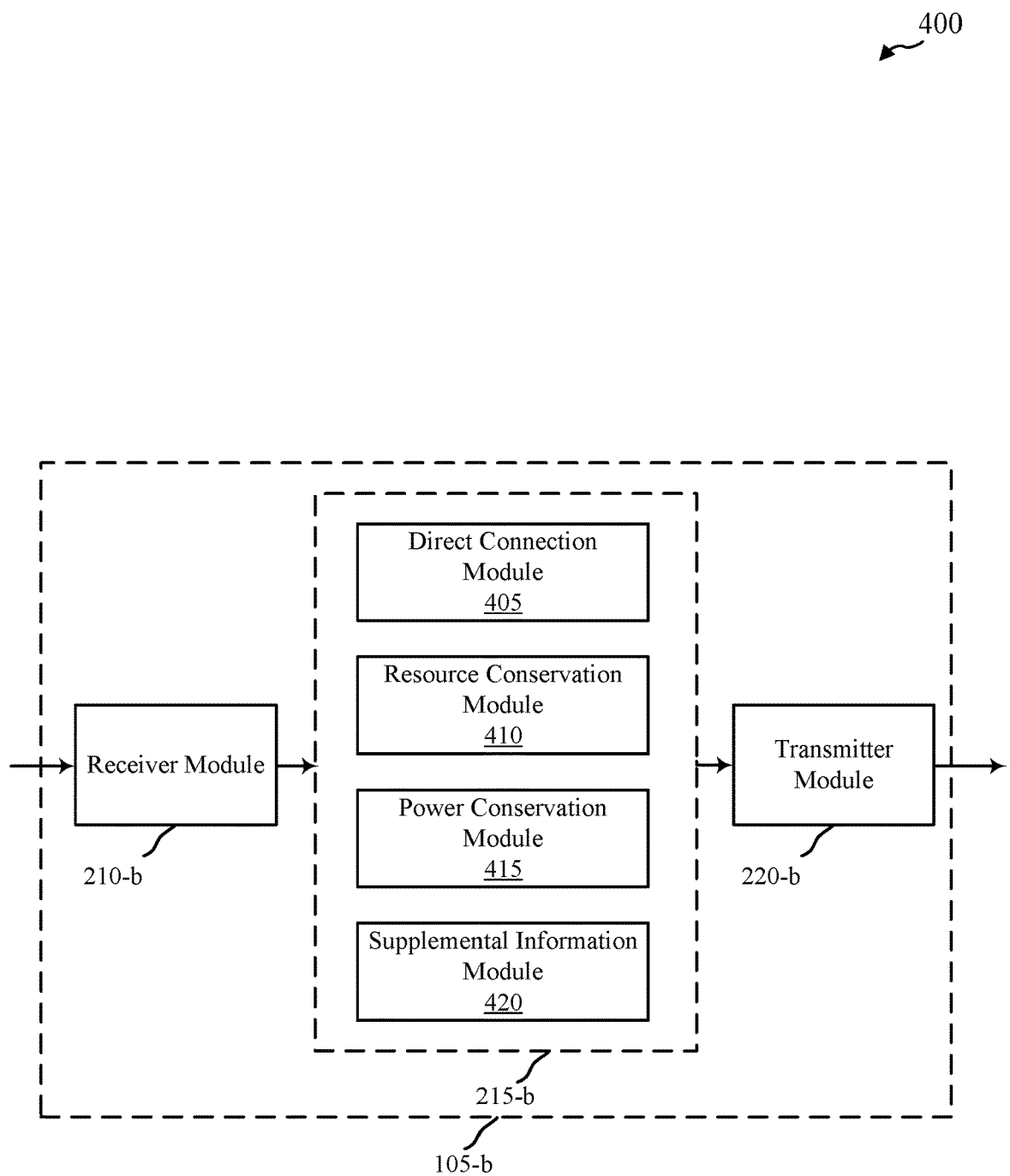
FIG. 4 shows a block diagram of a device configured for use in wireless communication, in accordance with various aspects of the present disclosure.

FIG. 4 shows a block diagram 400 of a base station 105-b for use in wireless communication, in accordance with various examples. The base station 105-b may be an example of one or more aspects of the device 205 described above with reference to FIG. 2 and/or an example of one or more aspects of the base stations 105, 105-a-1 described above with reference to FIG. 1. In some embodiments, the base station 105-b is configured to communicate with one or more UEs (e.g., UE 115, UE 115-a, UE 115-b) using a directional, first RAT, such as a millimeter wave-based RAT. The base station 105-b may include a receiver module 210-b, a control information module 215-b, and/or a transmitter module 220-b, which may be examples of the corresponding modules of device 205 in FIG. 2. The base station 105-b may also include a processor (not shown). Each of these components may be in communication with each other. The control information module 215-b may include a direct connection module 405, a resource conservation module 410, a power conservation module 415, and a supplemental information module 420. The receiver module 210-b and the transmitter module 220-b may perform the functions of the receiver module 210 and the transmitter module 220, of FIG. 2, respectively.

As described above, the control information module 215-b of the base station 105-b may be configured to identify control information associated with a directional, first RAT for a UE, and may also be configured to transmit the control information to another base station (e.g., base station 105-a-2 in FIG. 1, base station 105-c in FIG. 5, etc.) for forwarding to a UE using a second RAT. In some embodiments, the control information may be transmitted from the base station 105-b to the other base station over a backhaul link connecting the two base stations (e.g., an X2 interface). The connection between the base station 105-b and the other base station over the backhaul link together with a wireless connection between the other base station and a UE via a second RAT may form a supplemental link between the base station 105-b and UE, which may be used to transmit and receive control and response information even in those instances in which an insufficient directional connection exists between the base station 105-b and the UE using the directional, first RAT.

The direct connection module 405 of the control information module 215-b in FIG. 4 may be configured to monitor one or more direct connections (or lack thereof) between the base station 105-b and one or more UEs. If a direct connection is sufficiently established between the base station 105-b and a given UE, the direct connection module 405 may cause the base station 105-b to transmit control information to the UE using that direct connection. If, however, there is an insufficient direct connection between the base station 105-b and the UE over the directional, first RAT of the base station 105-b (including no direct connection, a weak direct connection, etc.), the control information may not be able to be transmitted from the base station 105-b to the UE using the directional, first RAT. In this instance, the direct connection module 405 may cause the base station 105-b to transmit the control information from base station 105-b to another base station for forwarding to the UE using another RAT.

There are several different situations in which there may be an insufficient connection between the base station 105-b and a particular UE. For example, if there is a lack of data to be transmitted between the base station 105-*b* and the UE, then no direct beam connection may be established between the base station 105-*b* and the UE. In this situation, even though there is no user data to exchange between the base station 105-*b* and the UE, the base station 105-*b* may still need to transmit control information to the UE, and possibly receive response data back from the UE. As mentioned above, there may be a relatively large amount of overhead (e.g., time and frequency resources and power needed to conduct a beam search) before a direct beam connection can be established in view of what may be a relatively small amount of control data. As such, in this instance, the direct connection module 405 may cause the control information to be transmitted to the UE over a supplemental link via another base station to conserve resources and/or power at the base station 105-*b*.

Another example of an insufficient direct connection may be caused by a failure of a previous direct transmission beam between the base station 105-*b* and a UE. A previous direct transmission beam may fail if the UE moves behind an obstacle, moves relative to a reflective object that was reflecting the beam, goes indoors, and so forth. Another example of an insufficient direct connection may be caused by an inadequate transmission beam between the base station 105-*b* and the UE—for example if a transmission beam does exist, but its signal-to-noise ratio (SNR) is relatively low. Still other examples of insufficient direct connections may be caused by overloading of the base station 105-*b* and/or overloading of the directional, first RAT itself. In these examples, the direct connection module 405 may cause the control information to be transmitted to the UE over a supplemental link via another base station and its associated RAT.

The resource conservation module 410 of the control information module 215-*b* in FIG. 4 may be configured to determine which resources (e.g., frequency resources, time resources, spatial resources, etc.) associated with the directional, first RAT and the base station 105-*b* would be needed to establish and/or maintain a sufficient direct connection between the base station 105-*b* and the UE in order to transmit the control information to the UE. The resource conservation module 410 may also be configured to determine whether those resources should be consumed or conserved. If it is determined that the resources should be conserved, then the resource conservation module 410 may cause the control information to be transmitted to another base station for forwarding to the UE via a supplemental connection using the second RAT. On the other hand, if it is determined that the resources should be consumed, the resource conservation module 410 may cause the direct connection to be set up and the control information can then be transmitted to the UE over the direct connection.

The power conservation module 415 of the control information module 215-*b* in FIG. 4 may be configured to determine how much power (e.g., for either the base station 105-*b*, the UE, or both) would be needed to establish and/or maintain a sufficient direct connection between the base station 105-*b* and the UE in order to transmit the control information to the UE. The power conservation module 415 may also be configured to determine whether that power should be consumed or conserved. If it is determined that the power should be conserved, then the power conservation module 415 may cause the control information to be transmitted to another base station for forwarding to the UE via a supplemental connection using the second RAT. On the other hand, if it is determined that the power should be consumed, the power conservation module 415 may cause the direct connection to be set up and the control information can then be transmitted to the UE over the direct connection.

The supplemental information module 420 of the control information module 215-*b* in FIG. 4 may be configured to include supplemental information in the control information destined for a UE in the event it is determined (e.g., by the direct connection module 405, the resource conservation module 410, the power conservation module 415, or some combination of these) to transmit the control information to another base station for forwarding to the UE using a different RAT. For example, the supplemental information module 420 may include forwarding information in the control information indicating to the other base station (to which the control information is transmitted by the base station 105-*b*) to forward the control information to the appropriate UE, including, in some instances, whether the control information should be transmitted to the UE using a control channel or a data channel of a RAT associated with the base station to which the control information is sent. The supplemental information module 420 may also include identifying information in the control information indicating to the UE that the control information originated from the base station 105-*b*.

Figure 5:
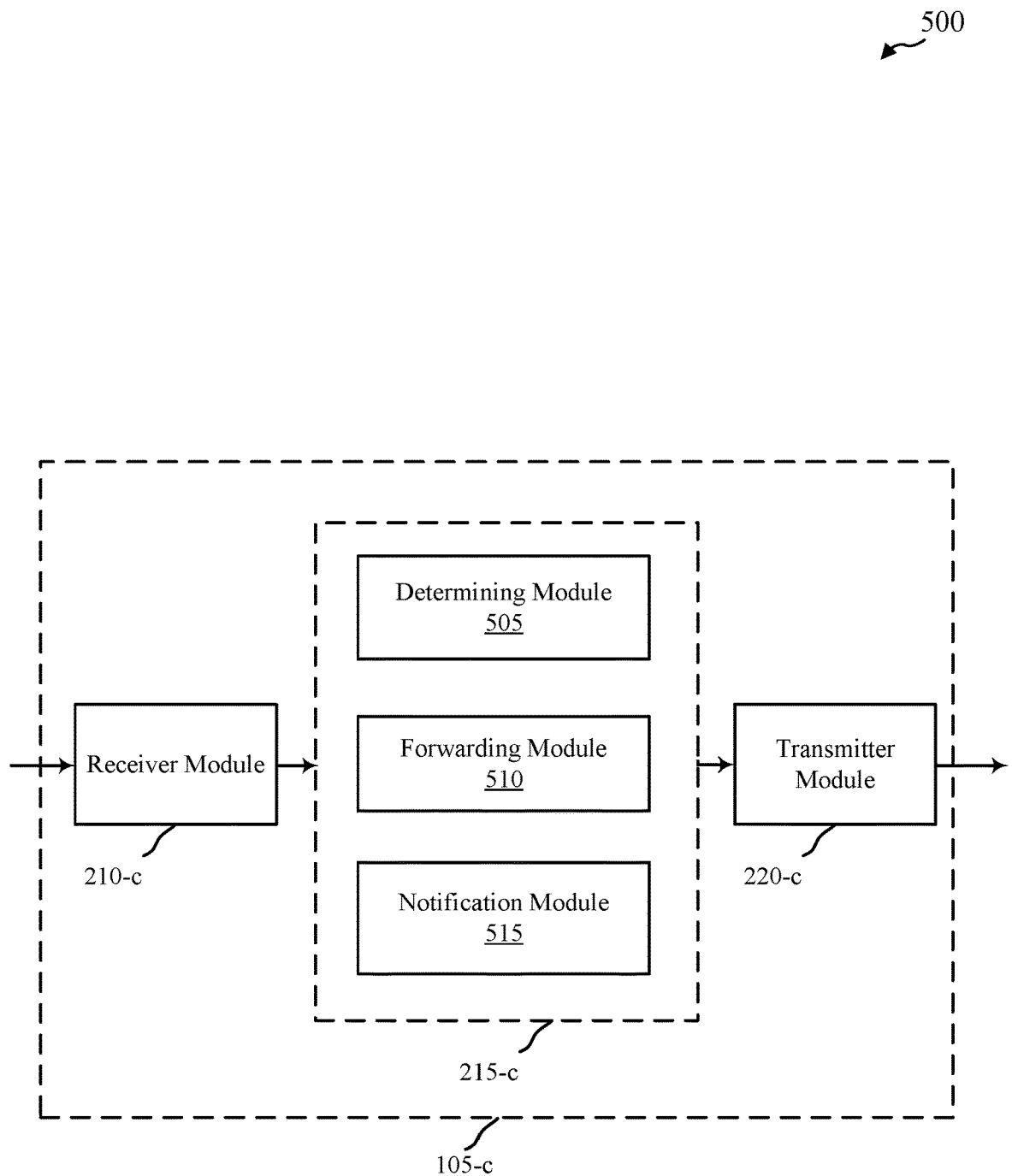
FIG. 5 shows a block diagram of a device configured for use in wireless communication, in accordance with various aspects of the present disclosure.

FIG. 5 shows a block diagram 500 of a base station 105-*c* for use in wireless communication, in accordance with various examples. The base station 105-*c* may be an example of one or more aspects of the device 205 described above with reference to FIG. 2 and/or an example of one or more aspects of the base stations 105, 105-*a*-2 described above with reference to FIG. 1. In some embodiments, the base station 105-*c* is configured to communicate with one or more UEs using a second RAT, such as an LTE-based RAT. The base station 105-*c* may include a receiver module 210-*c*, a control information module 215-*c*, and/or a transmitter module 220-*c*, which may be examples of the corresponding modules of device 205 in FIG. 2. The base station 105-*c* may also include a processor (not shown). Each of these components may be in communication with each other. The control information module 215-*c* may include a determining module 505, a forwarding module 510, and a notification module 515. The receiver module 210-*c* and the transmitter module 220-*c* may perform the functions of the receiver module 210 and the transmitter module 220, of FIG. 2, respectively.

As described above, the control information module 215-*c* of the base station 105-*c* may be configured to receive, from another base station (e.g., base station 105-*b* in FIG. 4, base station 105-*a*-1 in FIG. 1, etc.) control information associated with a directional, first RAT for a UE, where the other base station is configured to communicate with the UE using a directional, first RAT and the base station 105-*c* is configured to communicate with the UE using a second RAT. The control information module 215-*c* of the base station 105-*c* in FIG. 5 may also be configured to determine whether to forward the control information to the UE using the second RAT.

The determining module 505 of the control information module 215-*c* in FIG. 5 may be configured to determine whether to forward the control information received from another base station to a UE based on one or more factors. For example, if the number of control information forwarding requests from other base stations is relatively high and/or the base station 105-*c* is relatively busy (e.g., few or no spare resources are available to transmit the control information), the determining module 505 may determine not to forward the control information to the UE. As another example, if the base station 105-c has a relatively large amount of frequency and/or time resources available, or if the other base station pays a premium for the transmission of the control information, the determining module 505 may determine to forward the control information to the UE.

The forwarding module 510 of the control information module 215-c in FIG. 5 may be configured to selectively forward the control information to the UE based at least in part on the determination by the determining module 505. In order to forward the control information to the UE, the forwarding module may manipulate the control information, such as by removing headers, metadata, etc. associated with forwarding instructions used by the base station 105-c to know to which UE the control information should be forwarded, or by adding additional headers, metadata, etc. to the control information that indicates to the UE the source from which the base station 105-c received the control information.

In addition to selectively forwarding control information received from another base station to a UE, the forwarding module 510 may also be configured to (selectively) forward response information received from a UE to the other base station over a backhaul link. The response information may be responsive to the control information in some embodiments, but in other embodiments, may not be responsive to control information.

The notification module 515 of the control information module 215-c in FIG. 5 may be configured to selectively transmit a notification to the other base station when the control information is not forwarded to the intended UE. For example, if the base station 105-c is relatively busy and, as a result, will not be forwarding control information received from another base station to a UE, the notification module 515 may transmit the notification to the other base station, optionally including a reason for declining to forward the control information.

Figure 6:
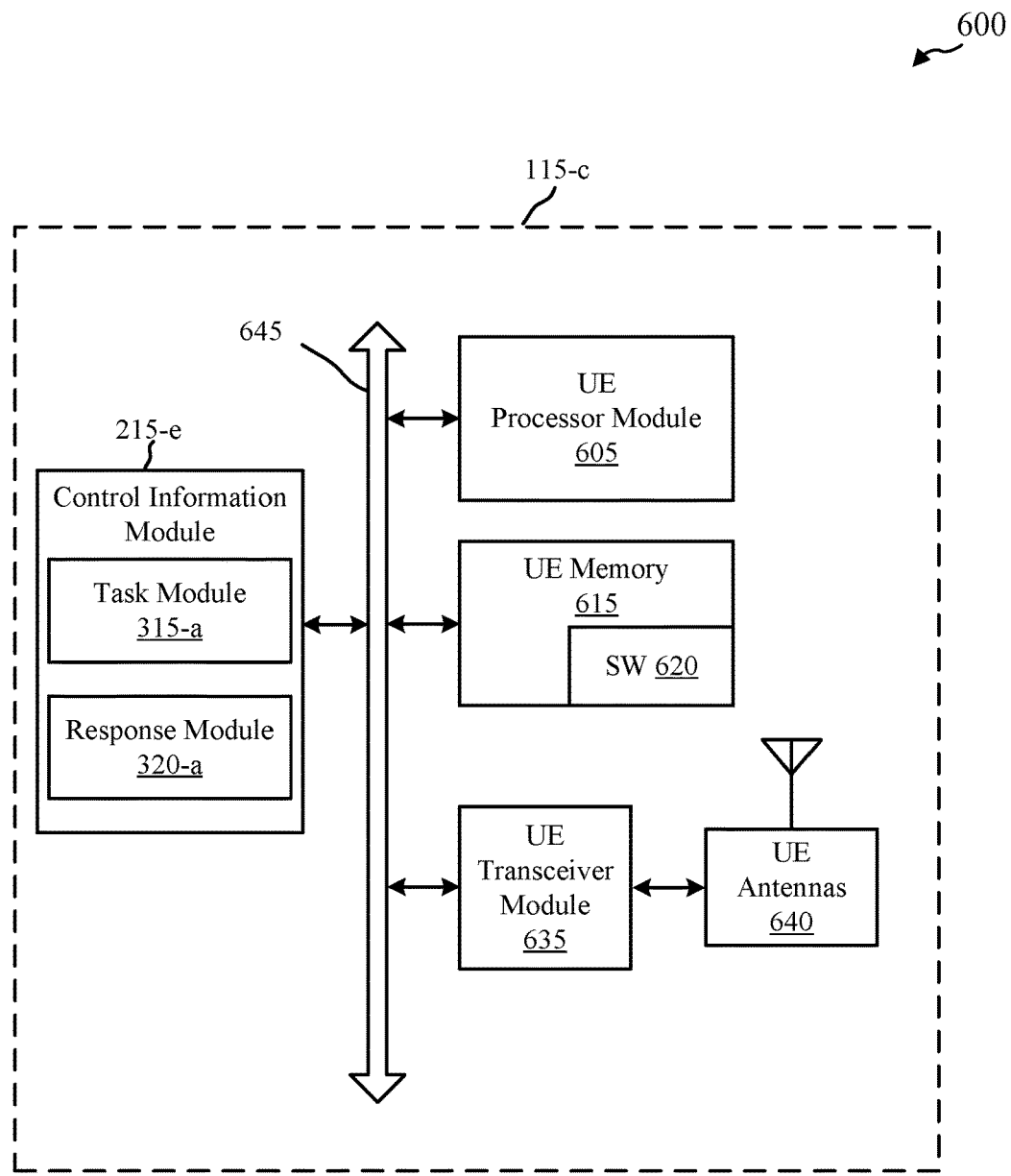
FIG. 6 shows a block diagram of an apparatus for use in wireless communication, in accordance with various aspects of the present disclosure.

FIG. 6 shows a block diagram 600 of an apparatus for use in wireless communication, in accordance with various examples. The apparatus shown in FIG. 6 is a UE 115-c, which may be an example of one or more aspects of the UEs 115, 115-a of FIG. 1. UE 115-c may also be an example of one or more aspects of the device 205 in FIG. 2, and/or the UE 115-b in FIG. 3. UE 115-c acts as a receiver when receiving DL transmissions from a base station, and acts as a transmitter when sending UL transmissions to the base station.

The UE 115-c may generally include components for bi-directional voice and data communications including components for transmitting communications and components for receiving communications. The UE 115-c may include one or more UE antenna(s) 640, a UE transceiver module 635, a UE processor module 605, and UE memory 615 (including software (SW) 620), which each may communicate, directly or indirectly, with each other (e.g., via one or more buses 645). The UE transceiver module 635 may be configured to communicate bi-directionally, via the UE antenna(s) 640 and/or one or more wired or wireless links, with one or more networks, as described above. For example, the UE transceiver module 635 may be configured to communicate bi-directionally with one or more base stations using different RATs. The UE transceiver module 635 may include a modem configured to modulate the packets and provide the modulated packets to the UE antenna(s) 640 for transmission, and to demodulate packets received from the UE antenna(s) 640. While the UE 115-c may include a single antenna 640 in some embodiments, in other embodiments, the UE 115-c may include multiple antennas 640 capable of concurrently transmitting and/or receiving multiple wireless transmissions. The UE transceiver module 635 may be capable of concurrently communicating with one or more base stations via multiple component carriers.

The UE 115-c may include a control information module 215-c, which may perform the functions described above and be an example of one or more aspects of the control information modules 215, 215-a in FIGS. 2-3. The UE 115-c also includes a task module 315-a, which may perform the functions described above for the task module 315 in FIG. 3. Also, the UE 115-c includes a response module 320-a, which may perform the functions described above for the response module 320 in FIG. 3.

The UE memory 615 may include random access memory (RAM) and read-only memory (ROM). The UE memory 615 may store computer-readable, computer-executable software/firmware code 620 containing instructions that are configured to, when executed, cause the processor module 605 to perform various functions described herein. Alternatively, the computer-readable, computer-executable software/firmware code 620 may not be directly executable by the UE processor module 605 but be configured to cause a computer (e.g., when compiled and executed) to perform functions described herein. The UE processor module 605 may include an intelligent hardware device, e.g., a central processing unit (CPU), a microcontroller, an application-specific integrated circuit (ASIC), etc.

Figure 7:
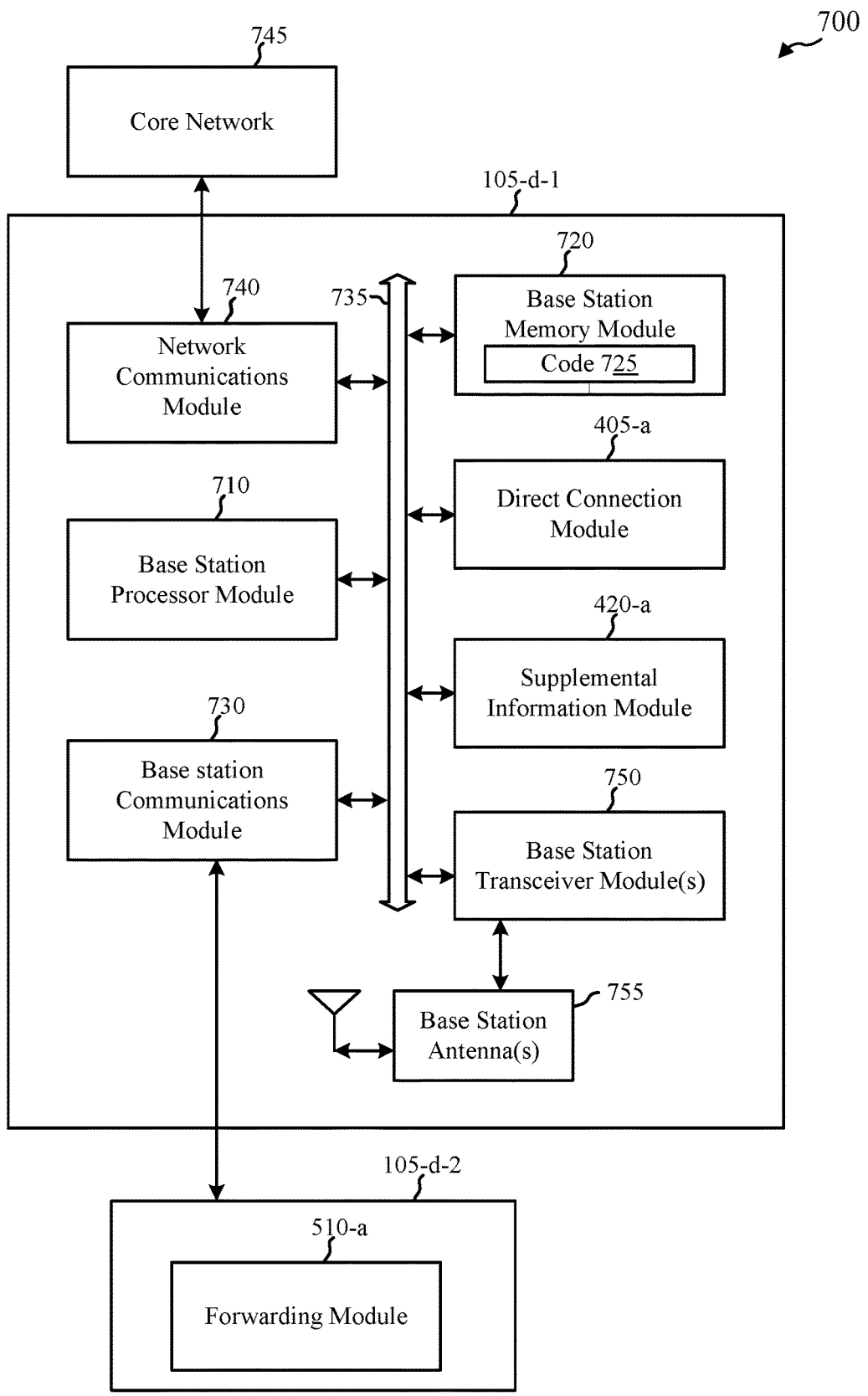
FIG. 7 shows a block diagram of an apparatus for use in wireless communication, in accordance with various aspects of the present disclosure.

FIG. 7 shows a block diagram 700 of a base station 105-d-1 for use in wireless communication, in accordance with various aspects of the present disclosure. In some examples, the base station 105-d-1 may be an example of aspects of one or more of the base stations 105, 105-a-1, 105-b described above, and/or aspects of the device 205 when configured as a base station, as described above with reference to FIGS. 1-2 and 3.

The base station 105-d-1 may include a base station processor module 710, a base station memory module 720, at least one base station transceiver module (represented by base station transceiver module(s) 750), and at least one base station antenna (represented by base station antenna(s) 755). The base station 105-a may also include one or more of a base station communications module 730 and/or a network communications module 740. Each of these modules may be in communication with each other, directly or indirectly, over one or more buses 735.

The base station memory module 720 may include random access memory (RAM) and/or read-only memory (ROM). The base station memory module 720 may store computer-readable, computer-executable software/firmware code 725 containing instructions that are configured to, when executed, cause the base station processor module 710 to perform various functions described herein related to wireless communication. Alternatively, the computer-readable, computer-executable software/firmware code 725 may not be directly executable by the base station processor module 710 but be configured to cause the base station 705 (e.g., when compiled and executed) to perform various of the functions described herein.

The base station processor module 710 may include an intelligent hardware device, e.g., a central processing unit (CPU), a microcontroller, an ASIC, etc. The base station processor module 710 may process information received through the base station transceiver module(s) 750, the base station communications module 730, and/or the network communications module 740. The base station processor module 710 may also process information to be sent to the transceiver module(s) 750 for transmission through the antenna(s) 755, to the base station communications module 730, for transmission to one or more other base stations 105-d-2 (described below), and/or to the network communications module 740 for transmission to a core network 745, which may be an example of one or more aspects of the core network 130 described with reference to FIG. 1. The base station processor module 710 may handle various aspects of wireless communications, as described herein.

The base station transceiver module(s) 750 may include a modem configured to modulate packets and provide the modulated packets to the base station antenna(s) 755 for transmission, and to demodulate packets received from the base station antenna(s) 755. The base station transceiver module(s) 750 may, in some examples, be implemented as one or more base station transmitter modules and one or more separate base station receiver modules. The base station transceiver module(s) 750 may support communications in a first radio frequency spectrum band (e.g., in the millimeter wave frequency spectrum band using a directional, first RAT) and/or a second radio frequency spectrum band. The base station transceiver module(s) 750 may be configured to communicate bi-directionally, via the antenna (s) 755, with one or more UEs or apparatuses described herein. The base station 105-d-1 may, for example, include multiple base station antennas 755 (e.g., an antenna array) that may facilitate beamforming and directional communications using the directional, first RAT. The base station 105-a may communicate with the core network 745 through the network communications module 740. The base station 105-d-1 may also communicate with other base stations, such as the base stations 105-d-2, using the base station communications module 730 over, for example, a backhaul link and/or through a link through the core network 745. As described above, the base station 105-d-1 may initiate a supplemental link for transmitting control information to a UE by transmitting the control information first to another base station 105-d-2 for forwarding to the UE by the other base station over a different RAT, as described above. The other base station 105-d-2 may include modules similar to the first base station 105-d-1 in FIG. 7, but instead of including a direct connection module or supplemental information module, the other base station 105-d-2 may include a forwarding module 510-a, which may be an example of one or more aspects of the forwarding module 510 in FIG. 5.

Figure 8:
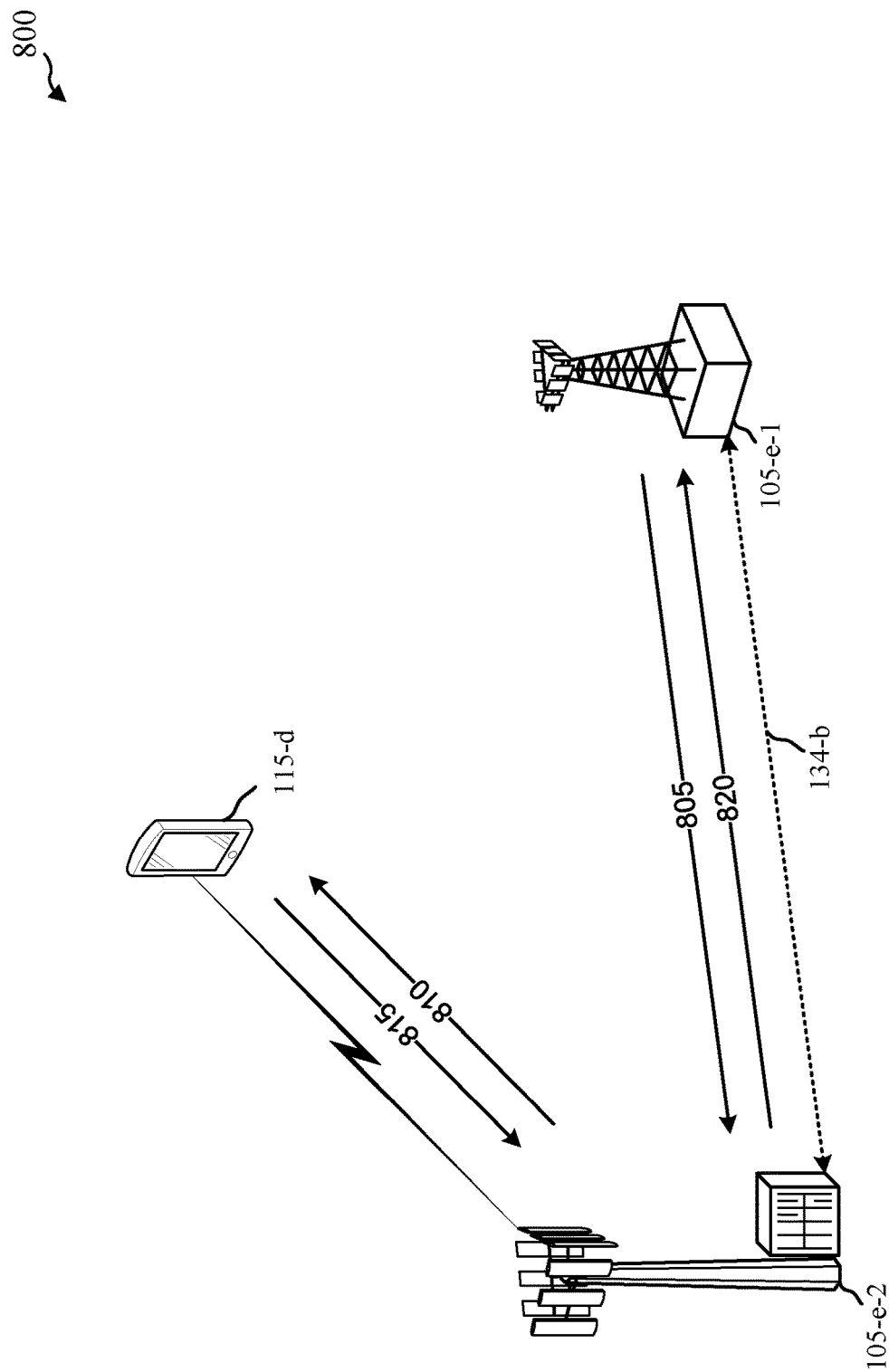
FIG. 8 shows a diagram illustrating one example of operation of a wireless communication system, in accordance with various aspects of the present disclosure.

FIG. 8 is an illustration 800 of a wireless communication system in which a first base station 105-e-1 may have an insufficient direct connection with a UE 115-d using a directional, first RAT, but may nonetheless have control information that needs to be sent to the UE 115-d. As a result, the first base station 105-e-1 may transmit control information intended for the UE 115-d to a second base station 105-e-2 over backhaul link 134-b for forwarding to the UE 115-d using a second RAT, as illustrated by communication 805 in FIG. 8. When transmitting the control information to the second base station 105-e-2, the first base station 105-e-1 may add supplemental information so that the second base station 105-e-2 can recognize and appropriately act on the control information, and/or so that the UE recognizes that the control information is not related to a wireless connection between the UE and the second base station 105-a-2, but is instead related to a directional RAT and the first base station 105-a-1. The supplemental information may be in the form of metadata, additional address fields in the transmission, and so forth. In some instances, the transmission of the control data from the first base station 105-e-1 to the second base station 105-e-2 may be in a newly defined data element, or may be in existing data element formats with or without new parameters.

Upon receipt of the control information, the second base station 105-e-2 may recognize that the control information needs to be relayed to the UE 115-d, and may determine whether to forward the received control information to the UE 115-d. If the second base station 105-e-2 determines to not forward the control information, then the second base station 105-e-2 may send a notification back to the first base station 105-e-1 over the backhaul link 134-b informing the first base station 105-e-1 that the control information was not forwarded. If, on the other hand, the second base station 105-e-2 decides to forward the control information to the UE 115-d, it may do so using a different, second RAT, with the forwarding of the control information to the UE 115-d illustrated in FIG. 8 by communication 810. The second base station 105 may, for example, use an LTE-based RAT to transmit the received control information to the UE 115-d, and may use one or both of a downlink control or downlink data channel of the LTE-based RAT for transmission of the control information.

Upon receiving the control information from the second base station 105-e-2, the UE 115-d may perform tasks related to the control information, such as collecting channel quality information regarding the first base station 105-e-1 and its associated RAT and sending response information, such as a channel quality report, back to the first base station 105-e-1. The UE 115-d may, however, first send the response information to the second base station 105-e-2 because, for example, the lack of a sufficient direct wireless connection between the first base station 105-e-1 and the UE 115-d, as illustrated by communication 815 in FIG. 8. The response information may be transmitted using the LTE-based RAT associated with the second base station 105-e-2, and may be transmitted over one or both of an uplink control or uplink data channel of the LTE-based RAT. Upon receiving the response information from the UE 115-d, the second base station 105-e-2 may forward the response information to the first base station 105-e-1 over the backhaul link 134-b, as illustrated by communication 820 in FIG. 8.

While FIG. 8 has been described with reference to the second base station 105-e-2 determining whether to forward the control information to the UE 115-d, in some embodiments, the core network (not shown in FIG. 8) may determine when the second base station 105-e-2 will or will not forward the control information. For example, the core network may deem the control information to be forwarded as having a higher priority than other data to be transmitted by the second base station 105-e-2. In this manner, and more generally, any of the base stations 105-e-1, 105-e-2, the UE 115-d, and/or the core network may individually or collectively determine whether to forward the control information, including when and how.

FIGS. 9, 10, 11, 12, and 13 illustrate several situations in which the system of FIG. 8 and the components illustrated in FIGS. 2-7 may be used—for example, to facilitate the transmission of control information related to one base station, one UE, and one RAT by using a second base station and a second RAT to transmit the control information to the UE. In each of these scenarios, there may be some reason why the first base station cannot or does not wish to transmit the control information directly to the UE using the directional, first RAT. As a result, the first base station may transmit control information destined for the UE to a second base station to forward to the UE using the second RAT. Note however, that FIGS. 9, 10, 11, 12, and 13 are not exhaustive, and other examples are possible, including for example where a beam search is underway but not yet completed, or where a UE newly powers on or newly requests a connection with the first base station.

Figure 9:
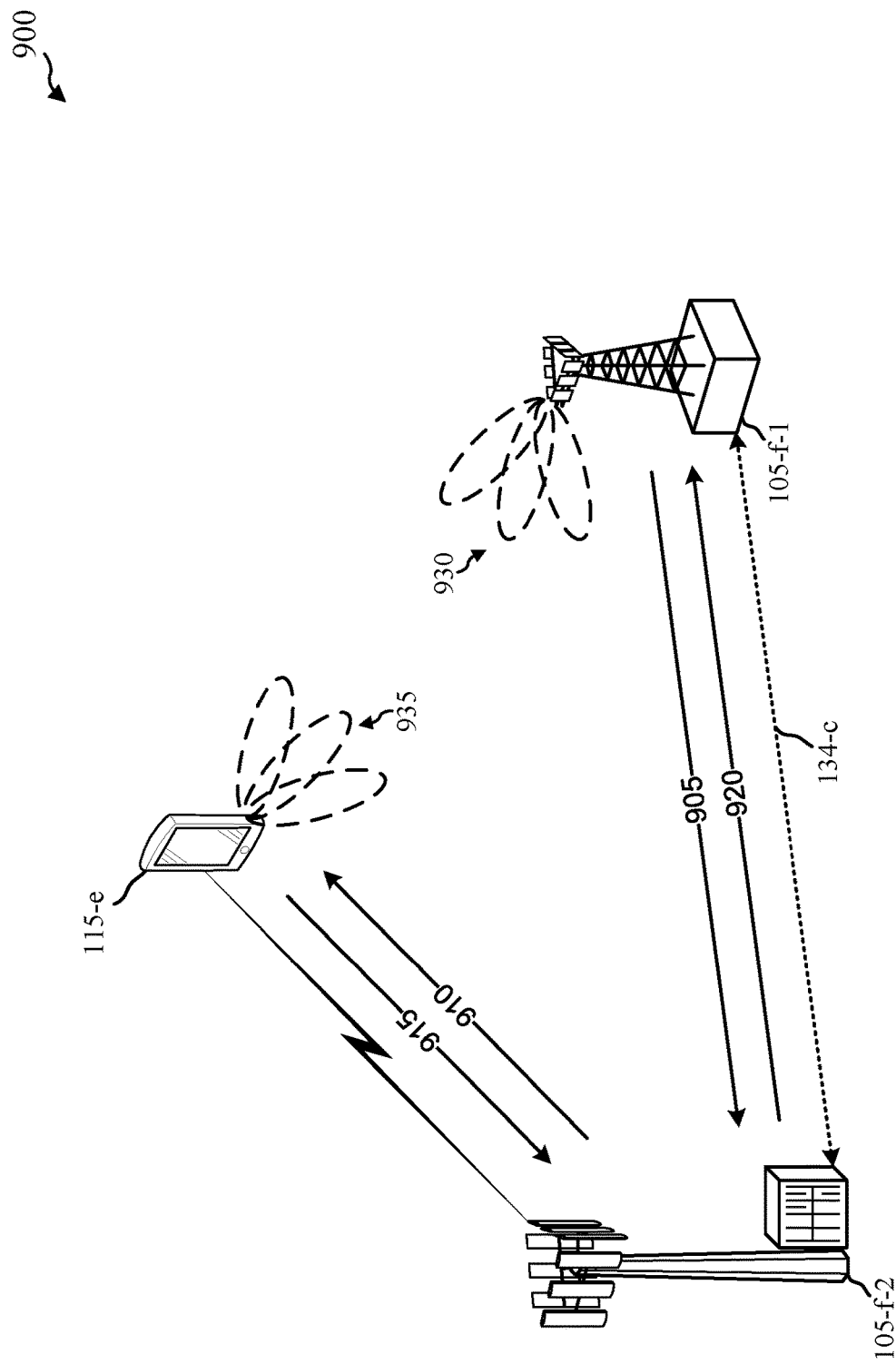
FIG. 9 shows a diagram illustrating one example of operation of a wireless communication system, in accordance with various aspects of the present disclosure.

Referring first to the example 900 illustrated in FIG. 9, the UE 115-e may be in an idle mode with no data to transmit to the first base station 105-f-1 and no data to receive from the first base station 105-f-2 using the directional, first RAT. Nonetheless, the first base station 105-f-2 may need channel quality indication (CQI) information related to the UE 115-e from time to time—for example how certain beam searching sequences 930 (corresponding to sequences 935) are perceived at the UE 115-e.

In order to establish a wireless connection between the first base station 105-f-1 and the UE 115-e, however, there is typically a relatively large amount of overhead processing that can consume resources (frequency, time, etc.) and power—for example in conducting beam tracking, a large amount of resources and power can be consumed. While the consumption of these resources may be justified if a relatively large amount of data needs to be transmitted from the first base station 105-f-1 to the UE 115-e, the relatively small amount of control data in FIG. 9 may not necessitate establishing and tracking a reliable beam between the first base station 105-f-1 and the UE 115-e. Accordingly, the first base station 105-f-1 may transmit control information, such as a CQI command, to the second base station 105-f-2 over backhaul link 134-c, along with a forwarding request and/or information identifying the control information and the intended recipient of the control information (i.e., the UE 115-e), as indicated by communication 905. Upon receiving the control information, the second base station 105-f-2 may determine whether or not to forward the control information to the UE 115-e. If the second base station 105-f-2 determines to not forward the control information, the second base station 105-f-2 may instead transmit a notification to the first base station 105f-1 so that the first base station 105-f-1 knows that the control information was not forwarded as requested. If, on the other hand, the second base station determines to forward the control information, it does so using a second RAT, as indicated by communication 910 in FIG. 9. The control information may be sent from the second base station 105-f-2 to the UE 115-e over a physical downlink shared channel, a physical downlink control channel, a combination of these, and so forth. In some embodiments, the initial communication 905 from the first base station 105-f-1 may indicate, or at least suggest, how the control information should be communicated to the UE 115-f, whereas in other embodiments the second base station 105-f-2 may determine how to transmit the control information to the UE 115-f alone or together with another entity, such as the core network.

The UE 115-e may in some instances respond to the control information by, for example, performing some action requested in the control information. For example, the UE 115-e may generate a CQI measurement report. If there is still no direct connection with the first base station 105-f-1, however, the UE 115-e may instead send the response information such as the CQI measurement report to the second base station 105-f-2 for forwarding on to the first base station 105-f-1 using the backhaul link 134-c. The transmission of the response information from the UE 115-e to the second base station 105-f-2 is shown by communication 915 in FIG. 9, and the transmission of the response information from the second base station 105-f-2 to the first base station 105-f-1 is shown by communication 920 in FIG. 9.

Figure 10:
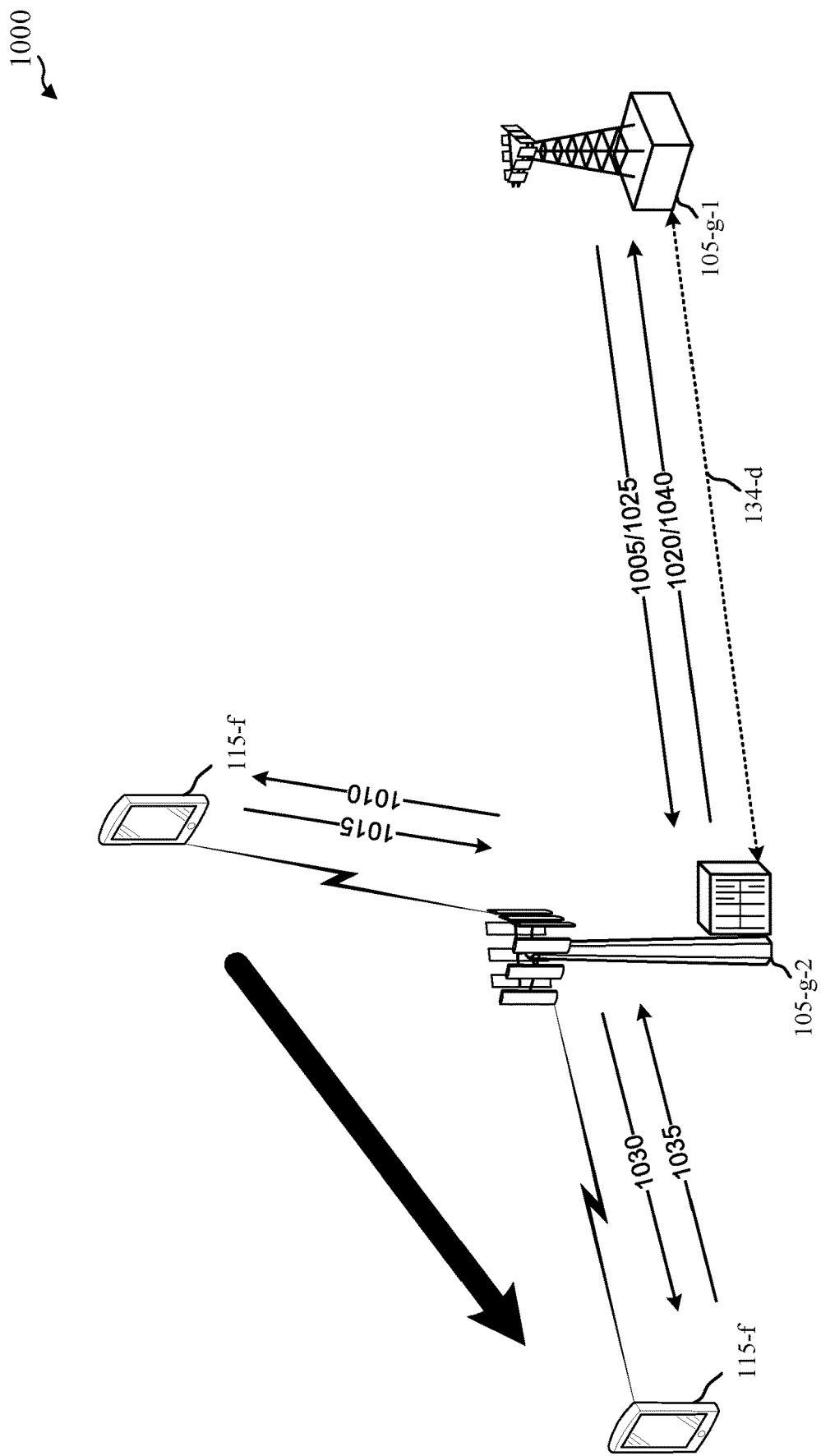
FIG. 10 shows a diagram illustrating one example of operation of a wireless communication system, in accordance with various aspects of the present disclosure.

Referring now to the example 1000 illustrated in FIG. 10, the first base station 105-g-1 may desire to maintain a contextual connection with the UE 115-f without incurring the resource and power consumption required by beam searching and beam tracking. This may particularly be the case where the UE 115-f is highly dynamic (e.g., moving), but has no data to transmit or receive with the first base station 105-g-using its directional RAT. In this instance, the first base station 105-g-1 may use the backhaul link 134-d and the second base station 105-g-2 to relay control and response information including periodic control messages and replies (e.g., keep alive messages and keep alive replies) between the UE 115-f and the first base station 105-g-1. Accordingly, the first base station 105-g-1 may request a control relay channel via the second base station 105-g-2 to send periodic control messages and receive periodic control replies using a RAT associated with the second base station 105-g-2 instead of the directional RAT associated with the first base station 105-g-1. The initial request for the second base station to initiate the relay channel is shown by communication 1005 in FIG. 10. The second base station 105-g-2 then sets up the relay channel using its RAT to forward periodic control messages to the UE 115-f, the first of which is shown at communication 1010 in FIG. 10. The UE 115-f may respond to the periodic control messages by sending periodic reply messages to the second base station 105-g-2, shown by communication 1015 in FIG. 10.

During operation, the UE 115-f may move, as illustrated by the bolded arrow in FIG. 10. After the UE 115-f moves, because of the reliability and robustness of the RAT associated with the second base station 105-g-2, the second base station 105-g-2 and the UE 115-f may continue to exchange control and response information, such as the periodic control messages and replies using the RAT associated with the second base station 105-g-2, as illustrated by communications 1025, 1030, 1035, 1040 in FIG. 10. In this manner, the first base station 105-g-1 can continue (via the supplemental link formed by backhaul link 134-d and the second base station 105-g-2 and its associated RAT) to send control information to the UE 115-f and receive response information back from the UE 115-f without the expense of tracking a beam between the first base station 105-g-1 and the UE 115-f.

Referring still to FIG. 10, in some embodiments, a trigger may be defined for sending the periodic control messages and/or replies. For example, the first or second base stations 105-g-1, 105-g-2 may define a periodic control message frequency based on needs, observed characteristics of the system (e.g., how much and how frequently the UE 115-f moves), and so forth. In other embodiments, the UE 115-f may additionally or alternatively trigger the transmission of the periodic control messages and/or replies (e.g., if the UE 115-f knows that it is being moved a lot, or if it anticipates imminent data transmission needs, etc.). In still other embodiments, the core network (not shown in FIG. 10) may determine how frequently the periodic control messages are exchanged.

Figure 11:
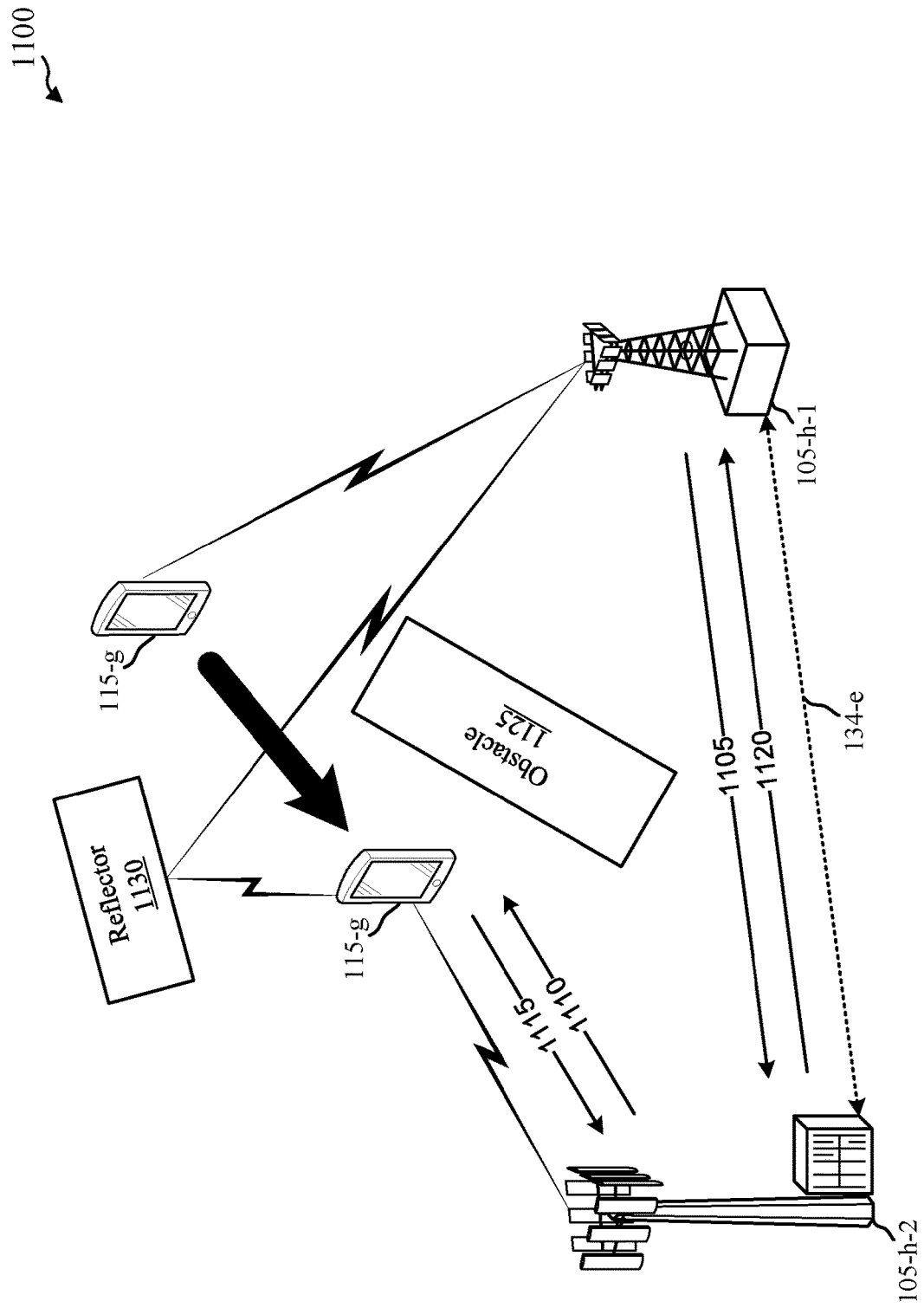
FIG. 11 shows a diagram illustrating one example of operation of a wireless communication system, in accordance with various aspects of the present disclosure.

Referring now to the example 1100 illustrated in FIG. 11, the UE 115-g may again be highly dynamic and moving (as indicated by the bolded arrow), which may cause a previously established (e.g., via beam forming) connection to fail because of an obstacle 1125. In this instance, the first base station 105-h-1 may transmit control information to the second base station 105-h-2 for forwarding to the UE 115-g in order to re-establish the connection. For example, the first base station 105-h-1 may transmit control information to the second base station 105-h-2 over backhaul link 134-e, with the control information including an alert message and a command for the UE 115-g to find another beam and to switch to it, as shown by communication 1105 in FIG. 11. The second base station 105-h-2 may then forward this control information to the UE 115-g, as shown by communication 1110 in FIG. 11. Upon receipt of the control information, the UE 115-g may search for and switch to a new beam—for example and as illustrated in FIG. 11, the UE 115-g may find a beam that is reflected from a reflector 1130, and may switch to that beam. The UE 115-g accordingly sends response information, such as a beam change message, to the second base station 105-h-2 for forwarding to the first base station 105-h-1, as shown by communication 1115 in FIG. 11. The second base station 105-h-2 may then forward the response information to the first base station, as shown by communication 1120 in FIG. 11. In some embodiments, the communications 1105, 1110, 1115, 1120 can be repeated several times, forming a type of feedback loop between the UE 115-g and the first base station 105-h-1

Figure 12:
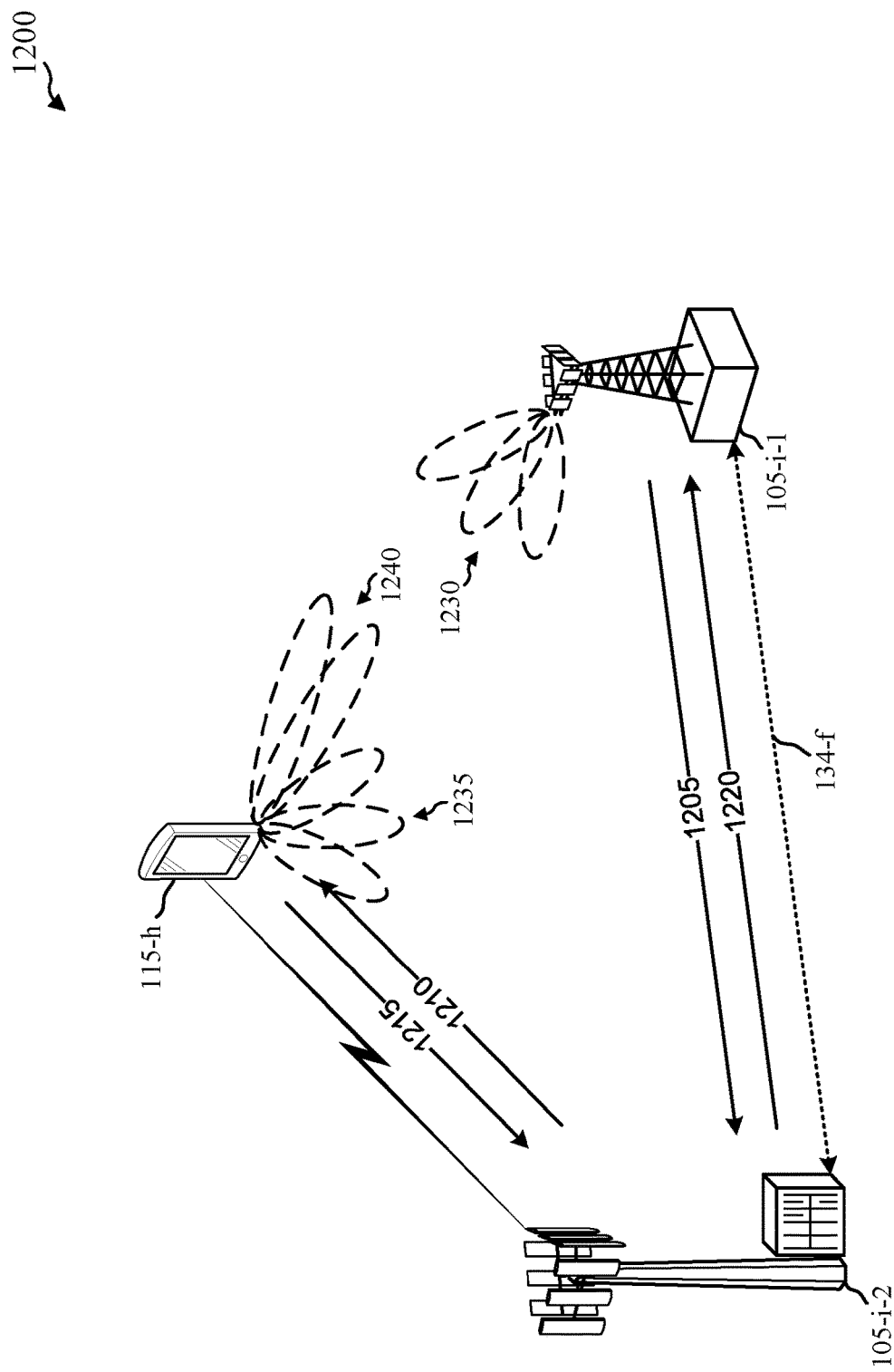
FIG. 12 shows a diagram illustrating one example of operation of a wireless communication system, in accordance with various aspects of the present disclosure.

Referring now to the example 1200 illustrated in FIG. 12, the first base station 105-i-1 may not have an adequate transmission beam with the UE 115-h despite the use of the beam searching sequences 1230, 1235 shown in FIG. 12. Accordingly, the first base station 105-i-1 may transmit control information including a request for additional beam forming training to the UE 115-h via the second base station 105-i-2. A request for additional beam forming may including longer code lengths, different modulations, etc. that seek to improve the signal-to-noise ratio (SNR) of the wireless connection between the first base station 105-i-1 and the UE 115-h. As shown in FIG. 12, after the first base station 105-i-1 transmits the control information to the second base station 105-i-2 (shown by communication 1205) over backhaul link 134-f and the second base station 105-i-2 forwards the control information to the UE 115-h (shown by communication 1210), the UE 115-h may use additional or alternative beam search sequences 1240 to try and establish a better transmission beam with the first base station 105-i-1. The UE 115-h may also send response information to the second base station 105-i-2 (shown by communication 1215) for forwarding on to the first base station (shown by communication 1220). The response information may include a confirmation that the UE 115-h will use different beam search sequences lengths in the next available beam search cycle, for example, so that the first base station 105-i-1 can adjust its own beam search settings for the next available beam search cycle.

Figure 13:
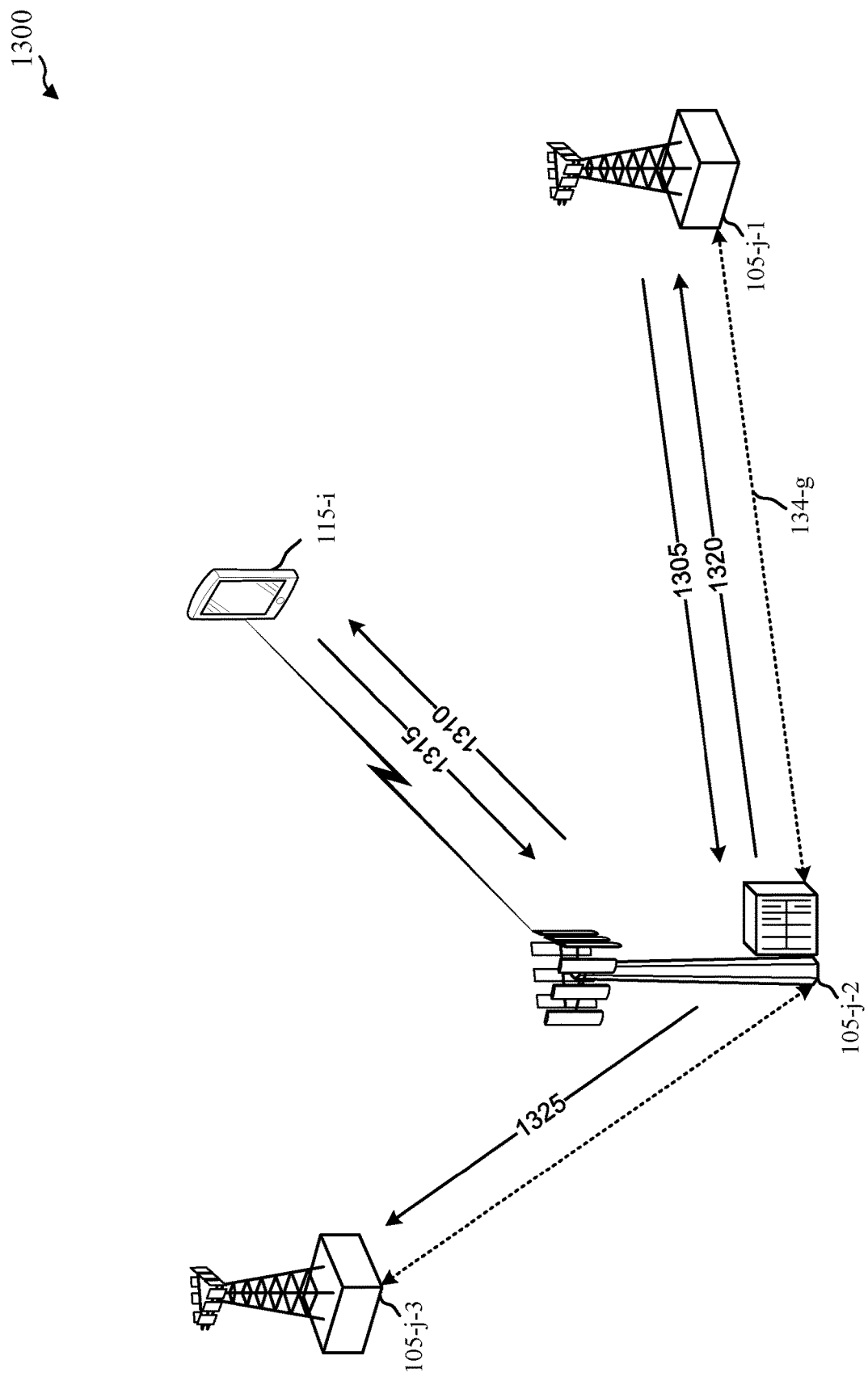
FIG. 13 shows a block diagram of a multiple-input/multiple-output communication system, in accordance with various aspects of the present disclosure.

Referring now to the example 1300 illustrated in FIG. 13, the first base station 105-j-1 may be overloaded—for example, the first base station 105-j-1 may have too many connections or may have too many data transmission requests pending. Accordingly, the first base station 105-j-1 may transmit control information including an indication of the overload and a request to transfer one or more UEs 115-i (e.g., to a third base station 105-j-3) to the second base station 105-j-2 over backhaul link 134-g, as shown by communication 1305 in FIG. 13. The second base station 105-j-2 may forward the control information to the UE 115-i so that the UE 115-i can search for a different base station, as shown by communication 1310 in FIG. 13. Once the UE 115-i finds the third base station 105-j-3, the UE 115-i may send response information indicating the same to the second base station 105-j-2, shown by communication 1315 in FIG. 13. The second base station 105-j-2 may, in turn, forward a confirmation of the transfer to the first base station 105-j-1 and/or the third base station 105-j-3, shown by respective communications 1320, 1325 in FIG. 13.

As previously mentioned, the examples given in FIGS. 8-13 are not exhaustive, and it will be appreciated that aspects from various examples can be combined, or other examples may similarly use the methods, apparatuses, and systems described herein.

Figure 14:
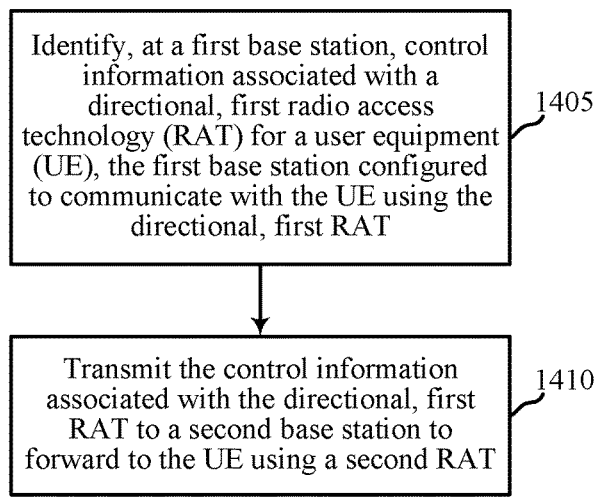
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the first base stations 105-a-1, 105-b, 105-d-1, 105-e-1, 105-f-1, 105-g-1, 105-h-1, 105-i-1, 105-j-1 described above with reference to FIGS. 1, 4, and 7-13. In some examples, one of these base stations may execute one or more sets of codes to control one or more of its functional elements to perform the functions described below. Additionally or alternatively, a base station may perform one or more of the functions described below using special-purpose hardware.

At block 1405, the method 1400 may include identifying, at the first base station, control information associated with a directional, first radio access technology (RAT) for a user equipment (UE), the first base station configured to communicate with the UE using the directional, first RAT. At block 1410, the method 1400 may include transmitting the control information associated with the directional, first RAT to a second base station to forward to the UE using a second RAT.

The operation(s) at blocks 1405 and 1410 may be performed using the control information module 215-b described above with reference to FIG. 4 in some embodiments.

Thus, the method 1400 may provide for wireless communication. It should be noted that the method 1400 is just one implementation and that the operations of the method 1400 may be rearranged or otherwise modified such that other implementations are possible.

Figure 15:
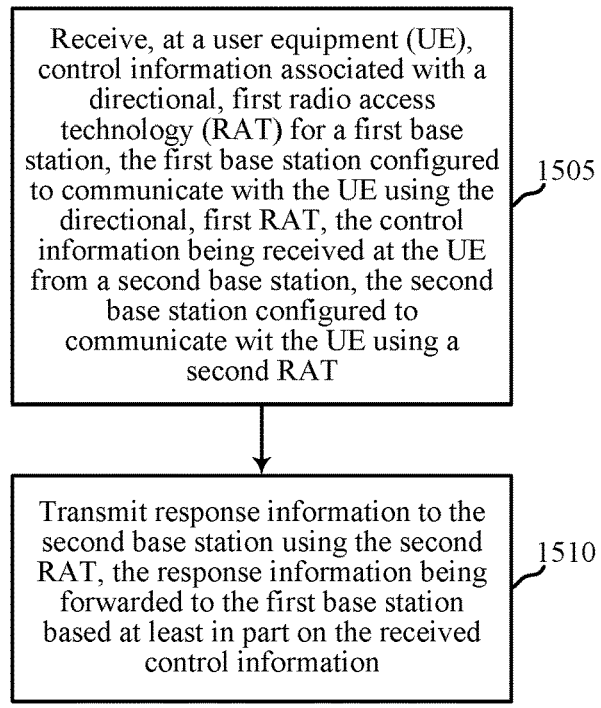
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the UEs 115, 115-a, 115-b, 115-c, 115-d, 115-e, 115-f, 115-g, 115-h, 115-i described above with reference to FIGS. 1, 3, 6, and 8-13. In some examples, one of these UEs may execute one or more sets of codes to control one or more of its functional elements to perform the functions described below. Additionally or alternatively, a UE may perform one or more of the functions described below using special-purpose hardware.

At block 1505, the method 1500 may include receiving, at the user equipment (UE), control information associated with a directional, first radio access technology (RAT) for a first base station, the first base station configured to communicate with the UE using the directional, first RAT, the control information being received at the UE from a second base station, the second base station configured to communicate with the UE using a second RAT. At block 1510, the method 1500 may include transmitting response information to the second base station using the second RAT, the response information being forwarded to the first base station based at least in part on the received control information.

The operation(s) at block 1505 may be performed using the control information module 215-a described above with reference to FIG. 3 in some embodiments.

Thus, the method 1500 may provide for wireless communication. It should be noted that the method 1500 is just one implementation and that the operations of the method 1500 may be rearranged or otherwise modified such that other implementations are possible.

Figure 16:
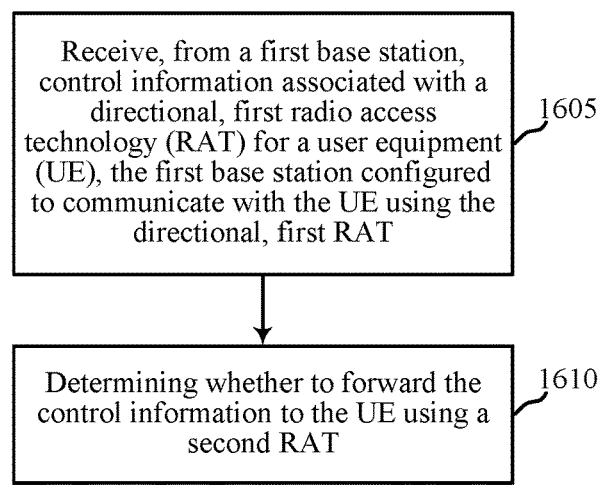
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the second base stations 105-*a*-2, 105-*c*, 105-*d*-2, 105-*e*-2, 105-*f*-2, 105-*g*-2, 105-*h*-2, 105-*i*-2, 105-*j*-2 described above with reference to FIGS. 1, 5, and 7-13. In some examples, one of these base stations may execute one or more sets of codes to control one or more of its functional elements to perform the functions described below. Additionally or alternatively, a base station may perform one or more of the functions described below using special-purpose hardware.

At block 1605, the method 1600 may include receiving, from a first base station, control information associated with a directional, first radio access technology (RAT) for a user equipment (UE), the first base station configured to communicate with the UE using the directional, first RAT. At block 1610, the method 1600 may include determining whether to forward the control information to the UE using a second RAT.

The operation(s) at block 1605 may be performed using the control information module 215-*c* described above with reference to FIG. 5 in some embodiments.

Thus, the method 1600 may provide for wireless communication. It should be noted that the method 1600 is just one implementation and that the operations of the method 1600 may be rearranged or otherwise modified such that other implementations are possible.

In some examples, aspects from two or more of the methods 1400, 1500, 1600 may be combined. It should be noted that the methods 1400, 1500, 1600 are just example implementations, and that the operations of the methods 1400, 1500, 1600 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
    receiving, by a user equipment (UE), control information from a second base station via an LTE-based communication link;
    using the control information to configure a millimeter wave-based communication between the UE and a first base station; and
    transmitting response information to the second base station via the LTE-based communication link, the response information being forwarded from the second base station to the first base station based at least in part on the control information.

2. The method of claim 1, further comprising:
    performing a task responsive to the control information, the response information comprising results of the performed task.

3. The method of claim 1, wherein the response information is forwarded from the second base station to the first base station over a backhaul link between the second base station and the first base station.

4. The method of claim 1, wherein the response information comprises one or more of:
    a channel quality indication (CQI) report, a keep-alive message reply, beam change information, beam searching information, or a combination thereof.

5. The method of claim 1, wherein the control information is first received at the second base station from the first base station and then forwarded to the UE from the second base station via the LTE-based communication link.

6. A method for wireless communication, comprising:
    receiving, by a second base station, control information from a first base station for configuring a millimeter wave-based communication between a user equipment (UE) and the first base station, wherein the second base station is configured to communicate with the UE via a LTE-based communication link;
    transmitting, by the second base station, the control information to the UE via the LTE-based communication link;
    receiving, by the second base station, response information from the UE via the LTE-based communication link; and
    forwarding, by the second base station, the response information to the first base station based at least in part on the control information.

7. The method of claim 6, further comprising:
    selectively transmitting a notification to the first base station when the control information is not forwarded to the UE.

8. The method of claim 6, further comprising:
    transmitting the control information to the UE over a control channel or a data channel associated with the LTE-based communication link.

9. An apparatus for wireless communication, comprising:
    a processor;
    memory in electronic communication with the processor; and
    instructions stored in the memory, the instructions being executable by the processor to:
        receive, by a user equipment (UE), control information from a second base station via an LTE-based communication link;
        use the control information to configure a millimeter wave-based communication between the UE and a first base station; and
        transmit response information to the second base station via the LTE-based communication link, the response information being forwarded from the second base station to the first base station based at least in part on the control information.

10. The apparatus of claim 9, wherein the memory further comprises instructions being executable by the processor to:
    perform a task responsive to the control information, the response information comprising results of the performed task.

11. The apparatus of claim 9, wherein the response information is forwarded from the second base station to the first base station over a backhaul link between the second base station and the first base station.

12. The apparatus of claim 9, wherein the response information comprises one or more of:
    a channel quality indication (CQI) report, a keep-alive message reply, beam change information, beam searching information, or a combination thereof.

13. The apparatus of claim 9, wherein the control information is first received at the second base station from the first base station and then forwarded to the UE from the second base station via the LTE-based communication link.

14. An apparatus for wireless communication, comprising:
    a processor;
    memory in electronic communication with the processor; and instructions stored in the memory, the instructions being executable by the processor to:

receive, by a second base station, control information from a first base station for configuring a millimeter wave-based communication between a user equipment (UE) and the first base station, wherein the second base station is configured to communicate with the UE via a LTE-based communication link;

transmit, by the second base station, the control information to the UE via the LTE-based communication link;

receive, by the second base station, response information from the UE via the LTE-based communication link; and forward, by the second base station, the response information to the first base station based at least in part on the control information.

15. The apparatus of claim 14, wherein the memory further comprises instructions being executable by the processor to:

selectively transmit a notification to the first base station when the control information is not forwarded to the UE.

16. The apparatus of claim 14, wherein the memory further comprises instructions being executable by the processor to:

transmit the control information to the UE over a control channel or a data channel associated with the LTE-based communication link.

\* \* \* \* \*